(12) United States Patent
Hiramatsu

(10) Patent No.: US 11,052,736 B2
(45) Date of Patent: Jul. 6, 2021

(54) SUNROOF APPARATUS

(71) Applicant: AISIN SEIKI KABUSHIKI KAISHA, Kariya (JP)

(72) Inventor: Shinichi Hiramatsu, Kariya (JP)

(73) Assignee: Aisin Seiki Kabushiki Kaisha, Kariya (JP)

(*) Notice: Subject to any disclaimer, the term of this patent is extended or adjusted under 35 U.S.C. 154(b) by 0 days.

(21) Appl. No.: 16/801,718

(22) Filed: Feb. 26, 2020

(65) Prior Publication Data

US 2020/0276893 A1    Sep. 3, 2020

(30) Foreign Application Priority Data

Feb. 28, 2019    (JP) .............................. JP2019-036043

(51) Int. Cl.
*B60J 7/043*    (2006.01)
*E05D 15/10*    (2006.01)
*B60J 7/057*    (2006.01)

(52) U.S. Cl.
CPC ........ *B60J 7/0435* (2013.01); *E05D 15/1047* (2013.01); *B60J 7/0573* (2013.01); *E05Y 2201/684* (2013.01); *E05Y 2900/542* (2013.01)

(58) Field of Classification Search
CPC ................................ B60J 7/024; B60J 7/0435
USPC ................................ 296/216.02–216.05, 223
See application file for complete search history.

(56) References Cited

U.S. PATENT DOCUMENTS 8,459,730 B2    6/2013  Sawada et al.
2007/0013210 A1*  1/2007  Sawada ................... B60J 7/024
                                                  296/216.01

FOREIGN PATENT DOCUMENTS

JP    2012-153336    8/2012

OTHER PUBLICATIONS

U.S. Appl. No. 16/801,688, filed Feb. 26, 2020, stored in USPTO.

* cited by examiner

*Primary Examiner* — Dennis H Pedder
(74) *Attorney, Agent, or Firm* — Finnegan, Henderson, Farabow, Garrett & Dunner, LLP

(57) ABSTRACT

A front link of a sunroof apparatus shifts, based on power transmitted from a first guide shaft of a front shoe, among a full-close corresponding position that allows a movable panel to be arranged in a full-close position, a front-up corresponding position that allows the movable panel to be arranged in a front-up position and a full-open corresponding position that allows the movable panel to be arranged in a full-open position. In a side view from a width direction of the front link, a first guide groove, through which the first guide shaft is inserted, extends so as to intersect with a line segment connecting a front connection shaft and a front support shaft.

20 Claims, 24 Drawing Sheets

SUNROOF APPARATUS

CROSS REFERENCE TO RELATED APPLICATIONS

This application is based on and claims priority under 35 U.S.C. § 119 to Japanese Patent Application 2019-036043, filed on Feb. 28, 2019, the entire content of which is incorporated herein by reference.

TECHNICAL FIELD

This disclosure generally relates to a sunroof apparatus.

BACKGROUND DISCUSSION

JP2012-153336A (Reference 1) describes a sunroof apparatus including a movable panel that opens/closes an opening of a roof panel equipped on a vehicle. This sunroof apparatus includes: a functional bracket (a panel bracket) that supports the movable panel; a guide rail that extends in a front-rear direction of the vehicle; a drive shoe that moves along the guide rail; a front link that supports a front edge of the functional bracket; and a rear link that supports the functional bracket at a more rearward position of the vehicle than the front link.

The front link, in conjunction with movement of the drive shoe in the front-rear direction of the vehicle, rotates in such a way that the front edge of the functional bracket is raised/lowered, or moves along with the front edge of the functional bracket in the front-rear direction of the vehicle. The rear link moves in an up-down direction of the vehicle in such a way that a rear end of the functional bracket is raised/lowered in conjunction with movement of the drive shoe in the front-rear direction of the vehicle. In this way, according to the movement of the front link and the rear link, the movable panel performs a tilt operation (a rear tilt operation) in which the rear edge of the movable panel shifts in the up-down direction of the vehicle in relation to the front edge, or performs a slide operation in which the movable panel moves in the front-rear direction of the vehicle in a state where the rear edge of the movable panel is shifted in the upward direction of the vehicle in relation to the front edge.

When the vehicle is running, a load in the upward direction of the vehicle may apply to the movable panel of the sunroof apparatus. In such a case, a load in the upward direction of the vehicle applies to an engagement part between the front link and the functional bracket, and a load in the downward direction of the vehicle applies to an engagement part between the front link and the drive shoe. In the above-described sunroof apparatus, the engagement part between the front link and the functional bracket is positioned in the forward direction of the vehicle than a rotation center of the front link, and the engagement part between the front link and the drive shoe is positioned in the rearward direction of the vehicle than the rotation center of the front link. Accordingly, with the above-described sunroof apparatus, when the vehicle is running or the like, in a case that a load in the upward direction of the vehicle is applied, a relatively large bending moment is likely to apply to the front link. Thus, there is an issue that the front link tends to be manufactured in a large size so as to secure rigidity of the front link.

A need thus exists for a sunroof apparatus which is not susceptible to the drawback mentioned above.

SUMMARY

A sunroof apparatus that solves the above-described-problem includes a movable panel, a panel bracket, a guide rail, a drive shoe, and a front support mechanism and a rear support mechanism. The movable panel opens/closes an opening formed in a roof of a vehicle. The panel bracket supports the movable panel. The guide rail extends in a front-rear direction of the vehicle. The drive shoe moves along the guide rail. The front support mechanism and the rear support mechanism support the panel bracket. The front support mechanism includes a front link that supports a front edge of the panel bracket and has a first guide groove, a front connection shaft that connects the panel bracket and the front link in a relatively rotatable manner around an axial line extending in a width direction of the vehicle, a front support shaft that supports the front link in a rotatable manner around an axial line extending in the width direction of the vehicle, and a front shoe that is configured to include a first guide shaft to be inserted in the width direction of the vehicle through the first guide groove and move along the guide rail. The rear support mechanism includes a rear link that supports the panel bracket at a rearward position of the vehicle from the front link. The movable panel performs a first tilt operation between a full-close position where the movable panel fully closes the opening and a rear-up position where a rear edge of the movable panel is raised higher than the full-close position, a second tilt operation between the rear-up position and a front-up position where a front edge of the movable panel is raised higher than the rear-up position, and a slide operation between the front-up position and a full-open position where the movable panel is moved in a rearward direction of the vehicle than the front-up position. The front link shifts, based on power to be transmitted from the first guide shaft of the front shoe, among a full-close corresponding position that allows the movable panel to be arranged in the full-close position, a front-up corresponding position that allows the movable panel to be arranged in the front-up position, and a full-open corresponding position that allows the movable panel to be arranged in the full-open position. The rear link shifts, based on power to be transmitted from the drive shoe, between a collapsed position that allows the movable panel to be arranged in the full-close position and a standing position that allows the movable panel to be arranged in the rear-up position. The first guide groove extends so as to intersect with a line segment connecting the front connection shaft and the front support shaft, in a side view of the front link from the width direction of the vehicle.

The sunroof apparatus of the above-described configuration can suppress enlargement of the front link that supports the front edge of the movable panel.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
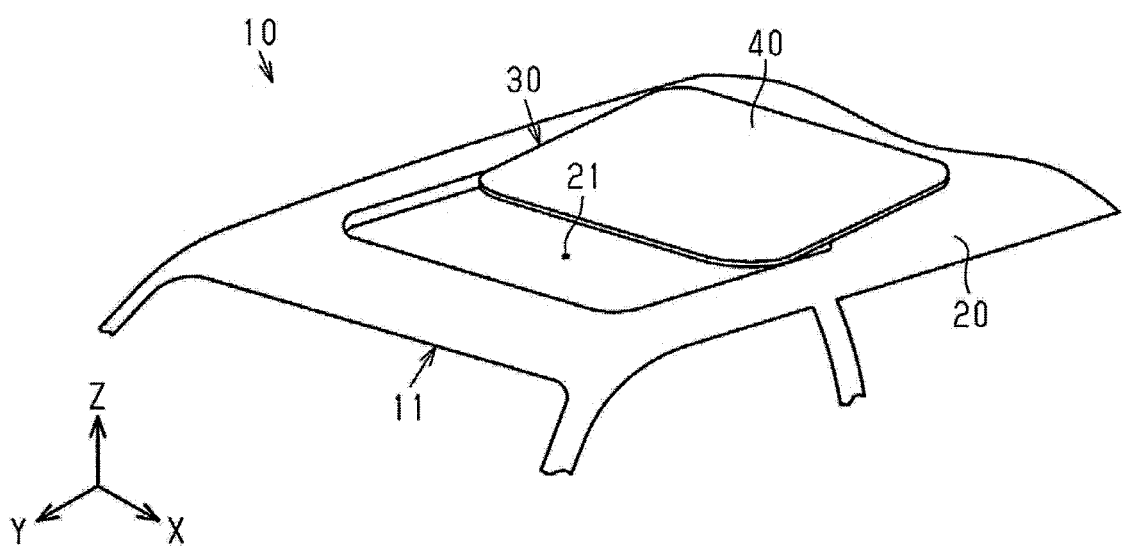
FIG. 1 is a perspective view illustrating a schematic configuration of a vehicle.

The following will describe an embodiment of a vehicle including the sunroof apparatus with reference to the drawings.

In this embodiment, the sunroof apparatus will be described using the width direction, front-rear direction, and up-down direction of the vehicle in a state where the sunroof apparatus is installed on the vehicle. Further, the width direction of the vehicle is also simply referred to as the "width direction," the front-rear direction of the vehicle is also simply referred to as the "front-rear direction," and the up-down direction of the vehicle is also simply referred to as the "up-down direction." The width direction is a direction where an X axis is extending; the front-rear direction is a direction where a Y axis is extending; and the up-down direction is a direction where a Z axis is extending in the drawings.

As illustrated in FIG. 1, the vehicle 10 includes: a vehicle body 11 that has a roof panel 20 in which an opening 21 is formed; and a sunroof apparatus 30 that opens/closes the opening 21.

Figure 2:
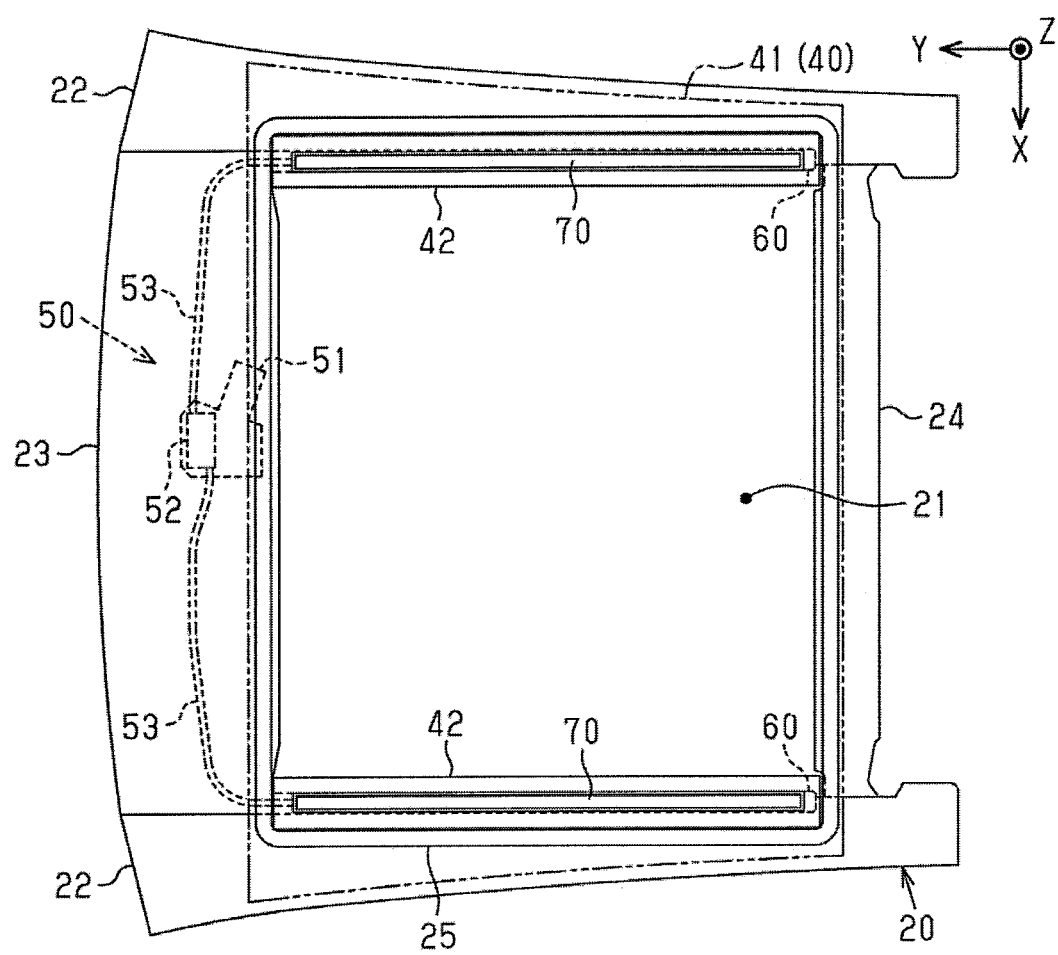
FIG. 2 is a plan view illustrating a schematic configuration of a sunroof apparatus equipped on a roof panel.

As illustrated in FIG. 2, the roof panel 20 includes: side frames 22 that extend in the front-rear direction on both sides in the width direction; a front frame 23 that connects the front ends of the side frames 22 in the width direction; and a rear frame 24 that connects the rear ends of the side frames 22 in the width direction. The roof panel 20 further includes: a weather strip 25 that is arranged to surround the opening 21. The opening 21 is divided into the side frames 22, the front frame 23 and the rear frame 24. In a plan view from above, the opening 21 forms a general rectangle shape with the width direction as the longitudinal direction and the front-rear direction as the lateral direction.

Figure 3:
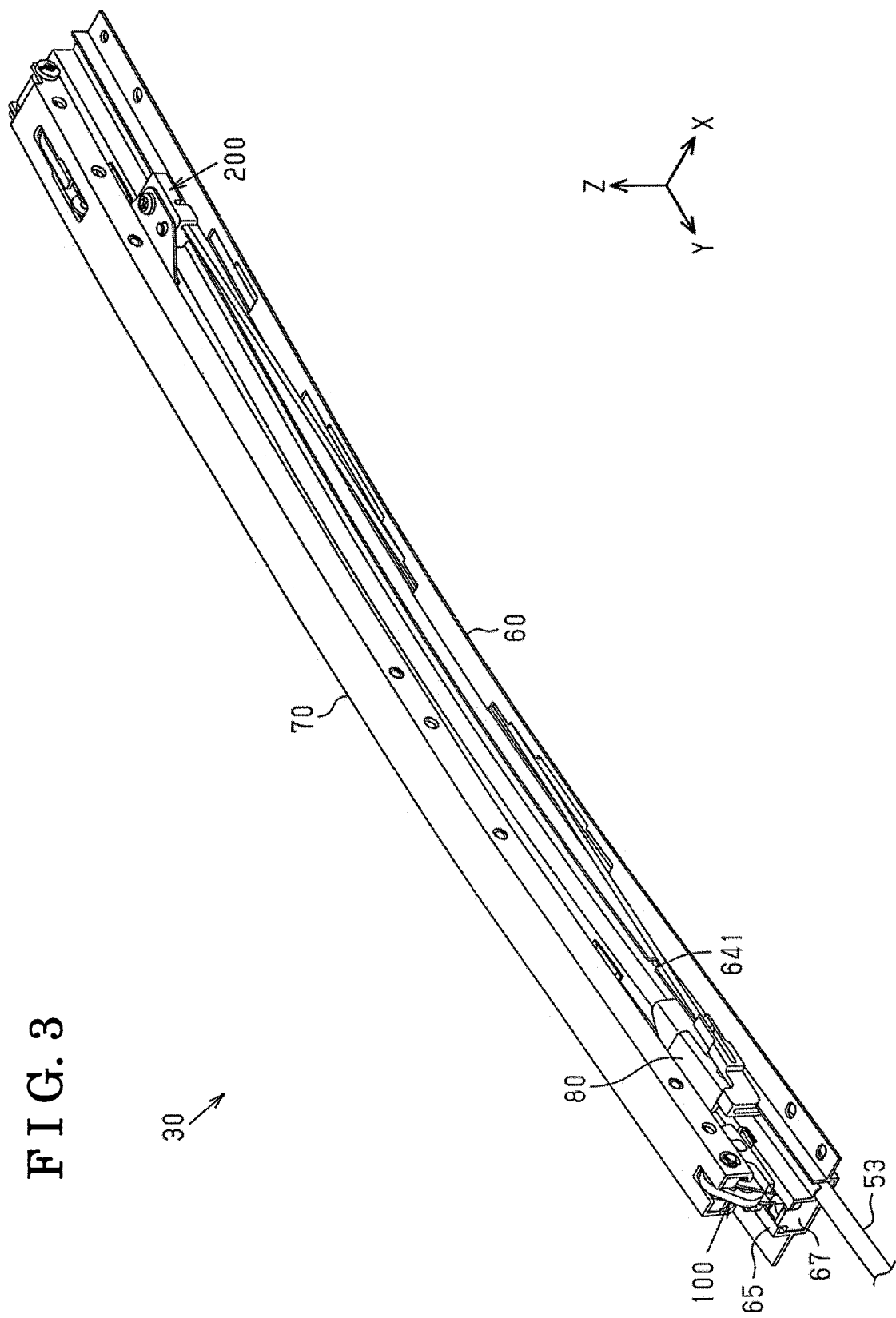
FIG. 3 is a perspective view illustrating a partial configuration of the sunroof apparatus.

As illustrated in FIG. 2, the sunroof apparatus 30 includes: a movable panel 40 that opens/closes the opening 21; and a roof actuator 50 as a power source for actuating the movable panel 40. Further, as illustrated in FIG. 3, the sunroof apparatus 30 includes: guide rails 60 that extend in the front-rear direction on both sides in the width direction of the opening 21; panel brackets 70 that support the movable panel 40; drive shoes 80 that respectively move along the guide rails 60; front support mechanisms 100 that respectively support the panel brackets 70; and rear support mechanisms 200 that respectively support the panel brackets 70.

Among the components of the sunroof apparatus 30 of this embodiment, the guide rails 60, the panel brackets 70, the drive shoes 80, the front support mechanisms 100, and the rear support mechanisms 200 are arranged in pairs on both sides in the width direction of the opening 21. The following will describe these components that are arranged on the right side of the vehicle 10.

As illustrated in FIG. 2, the movable panel 40 includes: a panel body 41 made of glass, transparent resin, or the like; and connection brackets 42 that are coupled to the panel body 41. The connection brackets 42 are arranged in pairs on both edges in the width direction of the movable panel 40. The connection bracket 42 is coupled to the lower surface of the movable panel 40 in a manner extending in the front-rear direction.

As illustrated in FIG. 2, the roof actuator 50 includes: an electric motor 51; a transmission 52 that switches the rotation movement of the output axis of the electric motor 51; and cables 53 that advance/retract by the transmission 52. The electric motor 51 and the transmission 52 are arranged at the center part in the width direction of the front frame 23. The cables 53 extend toward the respective drive shoes 80 that are arranged on both sides of the front frame 23 in the width direction.

As illustrated in FIG. 3, the guide rail 60 slightly curves downward as it extends from the rear end to the front end. In this embodiment, "extending in the front-rear direction" refers not only to the guide rail 60 extending linearly in the front-rear direction but also to the guide rail 60 extending in the front-rear direction in a curved manner as illustrated in FIG. 3. In other words, the longitudinal direction of the guide rail 60 is also referred to as the front-rear direction.

Figure 4:
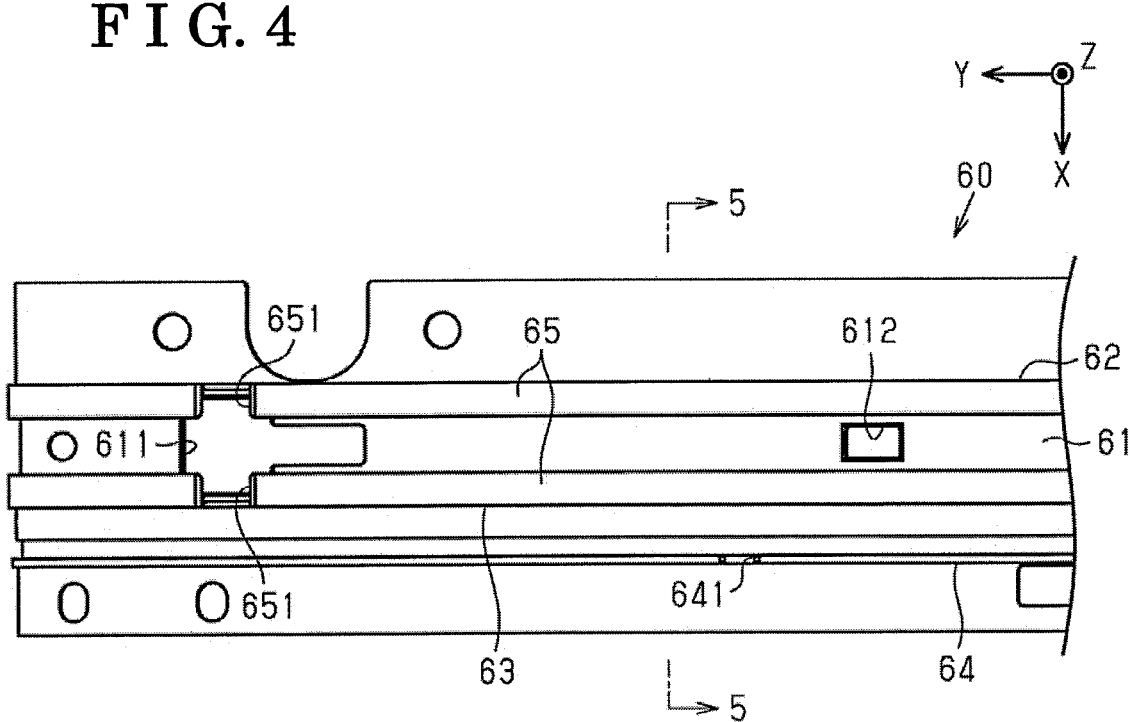
FIG. 4 is a plan view of a guide rail.
Figure 5:
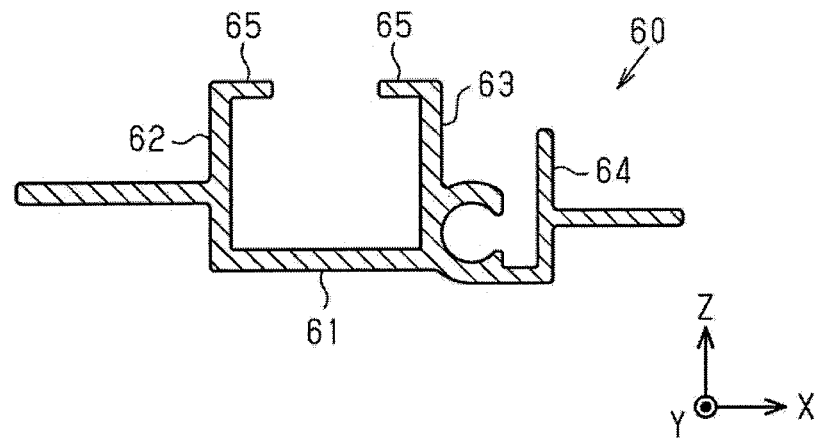
FIG. 5 is a cross section view taken along line 5-5 of FIG. 4.

As illustrated in FIGS. 4 and 5, the guide rail 60 has the generally same cross section shape along the longitudinal direction. The guide rail 60 has a bottom wall 61 as an example of the "wall," an external wall 62 that extends upward from the bottom wall 61, an internal wall 63, a side wall 64, and sliding walls 65 that extend in the width direction from the top ends of the external wall 62 and internal wall 63. The external wall 62 extends in the width direction from the external end of the bottom wall 61, the side wall 64 extends in the width direction from the internal end of the bottom wall 61, and the internal wall 63 extends from the middle position, between the external wall 62 and the side wall 64, of the bottom wall 61. The sliding walls 65 extend in a manner that one extends from the top end of the external wall 62 and the other extends from the top end of the internal wall 63 toward each other.

As illustrated in FIG. 4, the bottom wall 61 has a first recess 611 and a second recess 612 in the front edge of the guide rail 60. In addition, in the front edge of the guide rail 60, the sliding wall 65 has a first cutout 651 at a position where the sliding wall 65 overlaps the first recess 611 of the bottom wall 61 in a plan view from above. Further, the side wall 64 has a third recess 641 at a position between the first recess 611 and the second recess 612 in the longitudinal direction of the guide rail 60.

As illustrated in FIG. 3, the panel bracket 70 extends along the guide rail 60. Thus, the panel bracket 70 slightly curves downward as it extends from the rear end to the front end.

Figure 6:
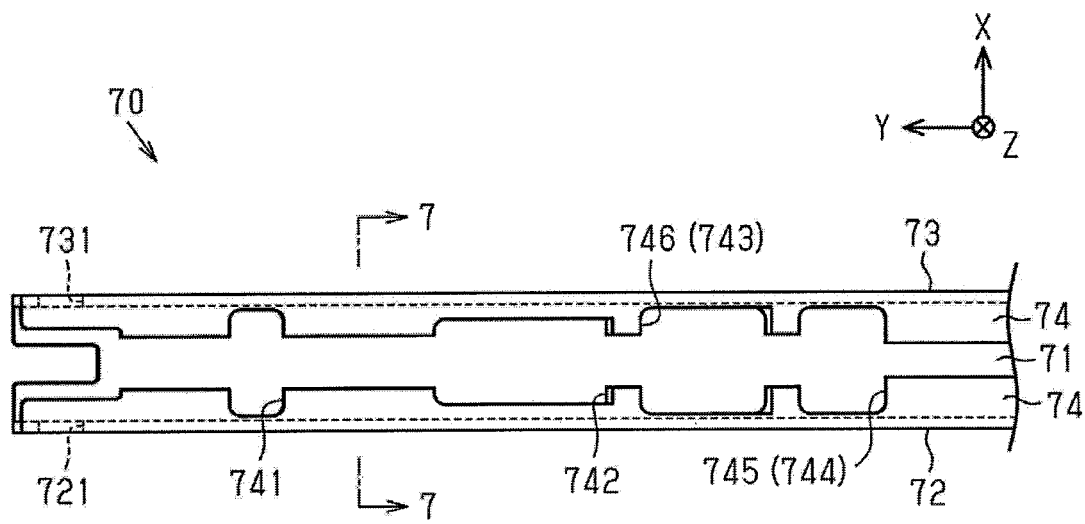
FIG. 6 is a bottom view of a panel bracket.
Figure 7:
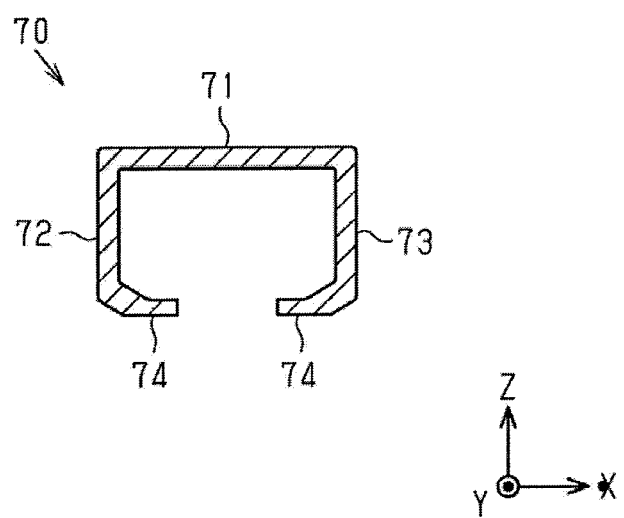
FIG. 7 is a cross section view taken along line 7-7 of FIG. 6.

As illustrated in FIGS. 6 and 7, the panel bracket 70 has the generally same cross section shape along the longitudinal direction. The panel bracket 70 includes: an upper wall 71; an external wall 72 and an internal wall 73 that respectively extend downward from the upper wall 71; and sliding walls 74 that extend in the width direction from the bottom ends of the external wall 72 and internal wall 73. The external wall 72 extends in the width direction from the external end of the upper wall 71, and the internal wall 73 extends in the width direction from the internal end of the upper wall 71. The sliding walls 74 extend in a manner that one extends from the bottom end of the external wall 72 and the other extends from the bottom end of the internal wall 73 toward each other.

As illustrated in FIG. 6, in the front edge of the panel bracket 70, the external wall 72 and the internal wall 73 respectively have a connection hole 721 and a connection hole 731, of which axis line extends in the width direction. In the front edge of the panel bracket 70, the sliding wall 74 has a second cutout 741, a third cutout 742, a fourth cutout 743, and a fifth cutout 744 which are aligned in the longitudinal direction of the panel bracket 70. The fifth cutout 744 forms a first contact part 745, and the fourth cutout 743 forms a second contact part 746. The first contact part 745 is a surface facing forward and the second contact part 746 is a surface facing rearward.

Then, the connection brackets 42 of the movable panel 40 are fixed to the panel brackets 70. Accordingly, when the panel brackets 70 shift, the movable panel 40 shifts in conjunction with the panel brackets 70. For example, when the front edges of the panel brackets 70 are raised or lowered in relation to the rear edges thereof, the front edge of the movable panel 40 is raised or lowered in relation to the rear edge thereof.

Figure 8:
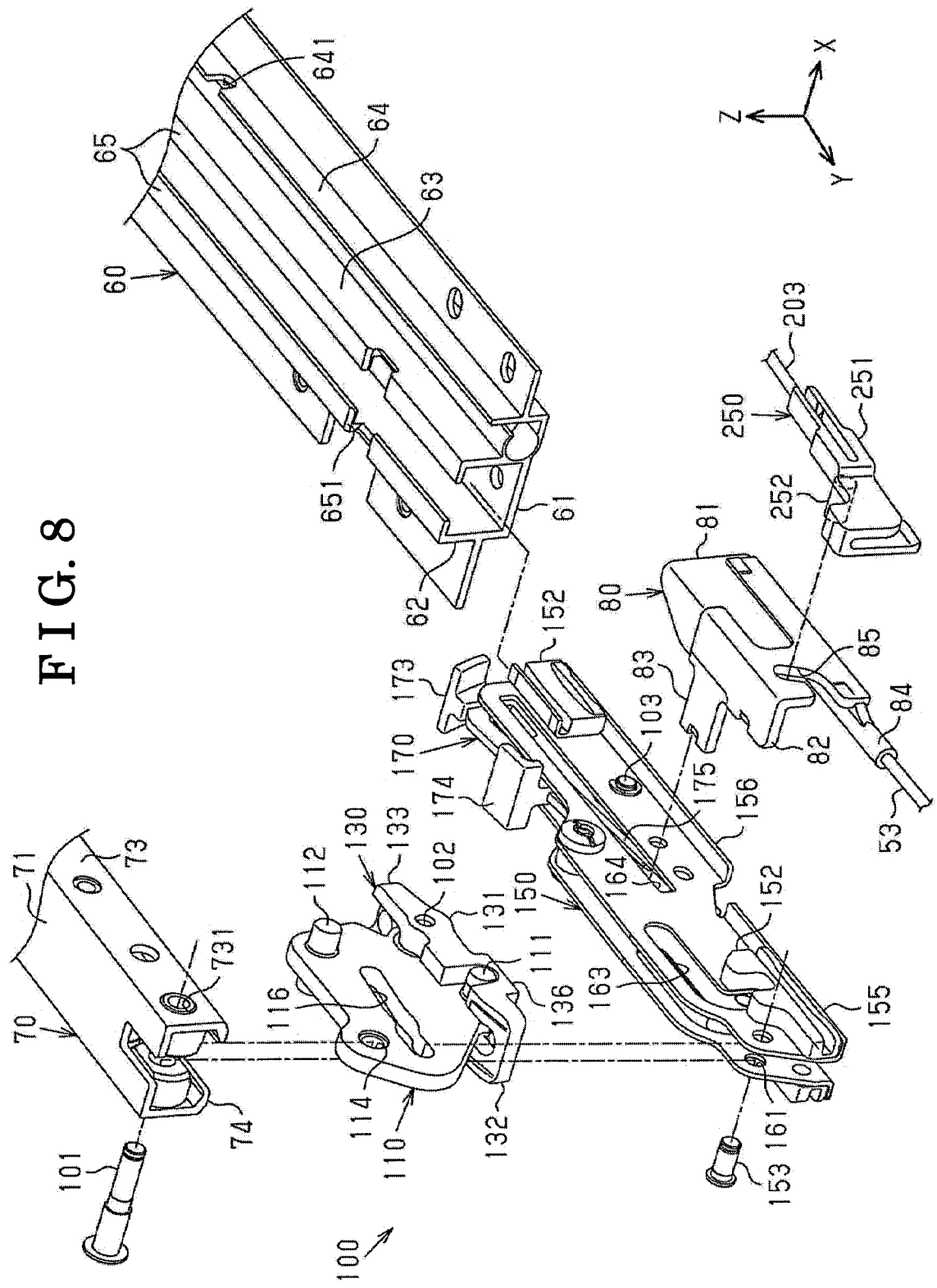
FIG. 8 is an exploded perspective view of a front support mechanism.

As illustrated in FIG. 8, the drive shoe 80 includes: a standing wall 81 that extends in the up-down direction; a bending wall 82 that extends outward in the width direction from the top end of the standing wall 81; a second guide shaft 83 that extends in the width direction from the bending wall 82; and a cable connection part 84 that extends in the front direction from the bottom end of the standing wall 81.

The standing wall 81 has a third guide groove 85 that extends upward as it extends in the rear direction. The second guide shaft 83 forms a flat plate. In particular, the cross section shape intersecting the longitudinal direction of the second guide shaft 83 forms a rectangle with the front-rear direction as the longitudinal direction and the up-down direction as the lateral direction. The cable connection part 84 is connected to the leading end of the cable 53 of the roof actuator 50.

The drive shoe 80 is arranged between the internal wall 63 and the side wall 64 of the guide rail 60, in a manner slidable with the guide rail 60. Once it is arranged inside the guide rail 60, the drive shoe 80 is restricted from moving in a direction perpendicular to the longitudinal direction of the guide rail 60. In this way, when the roof actuator 50 feeds the cable 53, the drive shoe 80 moves rearward along the guide rail 60, and when the roof actuator 50 withdraws the cable 53, the drive shoe 80 moves forward along the guide rail 60.

Next, the front support mechanism 100 will be described. As illustrated in FIG. 8, the front support mechanism 100 includes: a front link 110 that supports the front edge of the panel bracket 70; a front link check 130 that retains the posture of the front link 110; a front shoe 150 that moves along the guide rail 60 by power transmitted from the drive shoe 80; and a front shoe check 170 that switches power transmission state from the drive shoe 80 to the front shoe 150. In addition, the front support mechanism 100 includes: a front connection shaft 101 that connects the panel bracket 70 and the front link 110; a front support shaft 102 that connects the front link 110 and the front link check 130; and a check support shaft 103 that connects the front shoe 150 and the front shoe check 170. The front connection shaft 101, front support shaft 102 and check support shaft 103 have the width direction as the axis direction.

Figure 9:
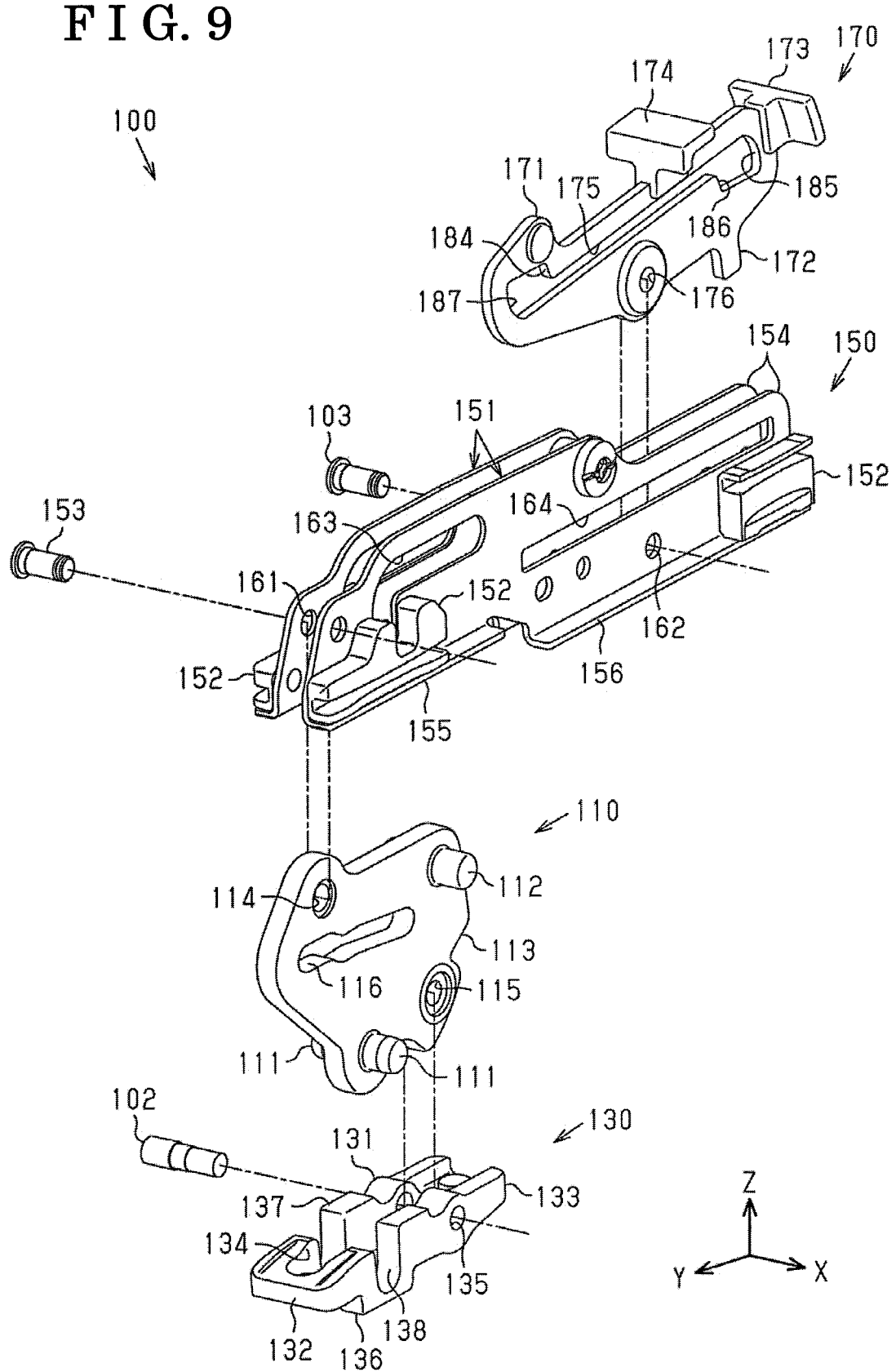
FIG. 9 is an exploded perspective view of the front support mechanism.
Figure 10:
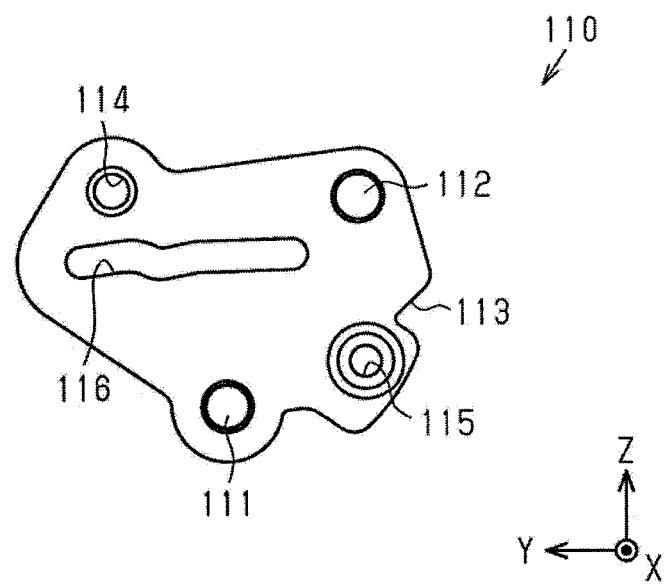
FIG. 10 is a side view of a front link.

As illustrated in FIGS. 9 and 10, the front link 110 forms a flat plate. The front link 110 has a first holding shaft 111 and a second holding shaft 112 with the width direction as the axis direction and the pressing surface 113 that presses the front link check 130. The front link 110 has a connection hole 114 and a support hole 115 that have the width direction as the axis direction, as well as, a first guide groove 116 that extends in a direction intersecting with a line segment connecting the connection hole 114 and the support hole 115. When the front link 110 is viewed from the width direction, the first holding shaft 111 and the second holding shaft 112 are arranged diagonally across the front link 110, and the connection hole 114 and the support hole 115 are arranged diagonally across the front link 110.

As illustrated in FIG. 8, the front link 110 is coupled to the panel bracket 70 when the front connection shaft 101 is inserted in the width direction through the connection hole 114 of the front link 110 and the connection holes 721, 731 of the panel bracket 70. When the front link 110 rotates in relation to the panel bracket 70 in both directions around the axis line of the front connection shaft 101, the second holding shaft 112 of the front link 110 enters into and comes out from the panel bracket 70 through the second cutouts 741 of the sliding walls 74 of the panel bracket 70 (refer to FIG. 6).

Figure 11:
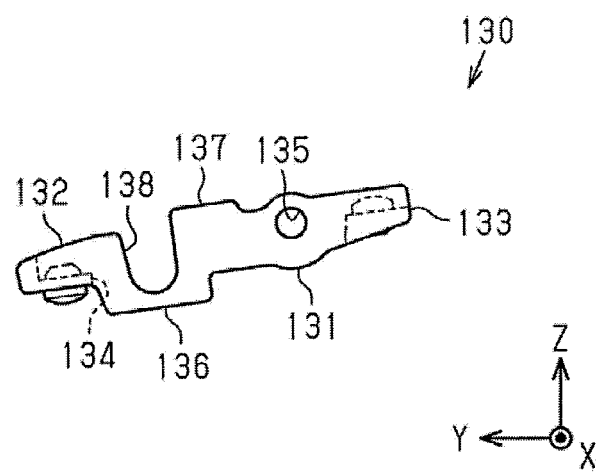
FIG. 11 is a side view of a front link check.

As illustrated in FIGS. 9 and 11, the front link check 130 has: a connection part 131 to be coupled to the front link 110; a front lever 132 that extends in the forward direction from the connection part 131; and a rear lever 133 that extends in the rearward direction from the connection part 131. The front link check 130 has a housing groove 134 extending over the connection part 131 and the front lever 132 in a direction intersecting with the extension direction of the front lever 132.

The connection part 131 has a support hole 135 with the width direction as the axis direction. The front lever 132 has a first convex 136 that can engage with the first recess 611 of the guide rail 60 (refer to FIG. 4) and a sliding surface 137 that slides with the front shoe 150. The first convex 136 protrudes downward from the middle part in the extension direction of the front lever 132. The first convex 136 forms a general rectangle in a plan view from below. The sliding surface 137 is formed on the front lever 132 at a proximal position than the first convex 136. Further, the front lever 132 has a housing recess 138 in a direction intersecting with the extension direction of the front lever 132. As illustrated in FIGS. 10 and 11, the distance from the center of the support hole 135 to the center of the housing recess 138 in a side view of the front link check 130 is equal to the distance from the center of the support hole 115 to the center of the first holding shaft 111 in a side view of the front link 110.

As illustrated in FIGS. 8 and 9, the front link check 130 is coupled to the front link 110 when the front support shaft 102 is inserted through the support hole 135 of the front link check 130 and the support hole 115 of the front link 110. In addition, when the front link 110 rotates both directions around the axis line of the front support shaft 192 in relation to the front link check 130, the front link 110 enters into or comes out from the housing groove 134 of the front link check 130 and the first holding shaft 111 of the front link 110 enters into and comes out from the housing recess 138.

Figure 12:
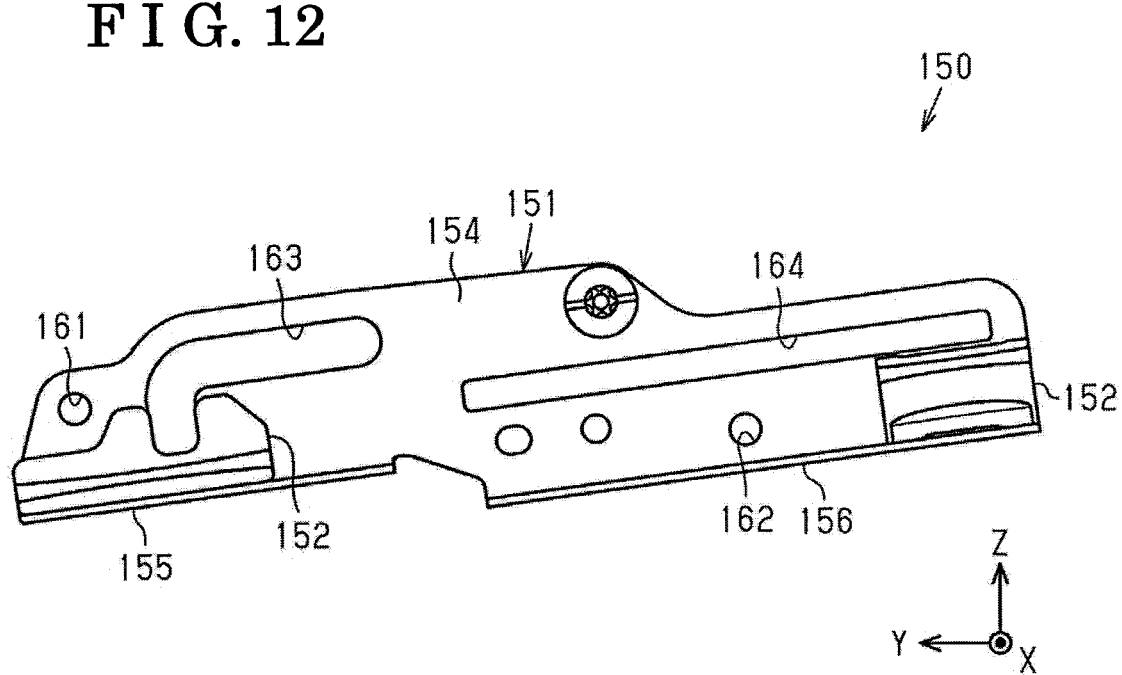
FIG. 12 is a side view of a front shoe.

As illustrated in FIGS. 9 and 12, the front shoe 150 has: a pair of front plates 151 that are arranged with a gap in the width direction; a plurality of front sliding parts 152 that slide with the sliding walls 65 of the guide rail 60; and a first guide shaft 153 that couples the pair of front plates 151 in the width direction.

The front plate 151 has a first plate 154, a second plate 155 and a third plate 156 that bend in the width direction from the bottom end of the first plate 154. The first plate 154 forms a plate with the front-rear direction as the longitudinal direction and the up-down direction as the lateral direction. The first plate 154 has a guide hole 161 and a support hole 162 with the width direction as the axis direction. In addition, the first plate 154 has a bending groove 163 that extends to bend in a side view from the width direction and a linear groove 164 that linearly extends in the front-rear direction. The guide hole 161 is formed in the front edge of the first plate 154 and the support hole 162 is formed at a position closer to the rear end of the first plate 154. The bending groove 163 is formed at a more rearward position than the guide hole 161 on the first plate 154. The bending groove 163 forms a hook shape that has a portion extending in the up-down direction and a portion extending in the front-rear direction. The linear groove 164 is formed at a position behind the bending groove 163, as well as, above the support hole 162 on the first plate 154. The second plate 155 and the third plate 156 form a rectangle plate with the front-rear direction as the longitudinal direction and the width direction as the lateral direction. The second plate 155 is positioned at a more forward position than the third plate 156. The lower surface of the second plate 155 is a part of the front shoe 150, which slides with the sliding surface 137 of the front link check 130. The pair of front plates 151 are coupled with a gap in the width direction. The gap between the pair of front plates 151 is wider than the thickness of the front link 110 and that of the front shoe check 170.

The front sliding parts 152 are formed on the upper surfaces of the second plate 155 and the third plate 156. The front sliding part 152 arranged on the second plate 155 has a cutout at a portion overlapping the bending groove 163 of the first plate 154 in a side view from the width direction.

As illustrated in FIGS. 8 and 9, the front shoe 150 is coupled to the front link 110 when the first guide shaft 153 is inserted in the width direction through the guide holes 161 of the front shoe 150 and the first guide groove 116 of the front link 110. In a state where the front shoe 150 and the front link 110 are coupled, the front link 110 is arranged between the pair of front plates 151, and the second holding shaft 112 of the front link 110 is inserted through the bending grooves 163 of the front shoe 150. In addition, in the same state, the front link check 130 is arranged below the second plate 155 of the front shoe 150.

As illustrated in FIG. 8, the front shoe 150 is arranged between the external wall 62 and the internal wall 63 of the guide rail 60 with a space with the bottom wall 61 of the guide rail 60. At this time, the front sliding parts 152 are engaged with the sliding walls 65 in a manner that the front sliding parts 152 hold the sliding walls 65 of, the guide rail 60 in the up-down direction. Since the front shoe 150 slides with the guide rail 60, the front shoe 150 is allowed to move in the longitudinal direction of the guide rail 60.

Then, when the front shoe 150 moves in the longitudinal direction of the guide rail 60, the first guide shaft 153 slides with the first guide groove 116 of the front link 110 or presses an end of the first guide groove 116 of the front link 110. In this way, the front shoe 150 transmits power to the front link 110 through the first guide shaft 153, thereby causing the movement of the front link 110.

Figure 13:
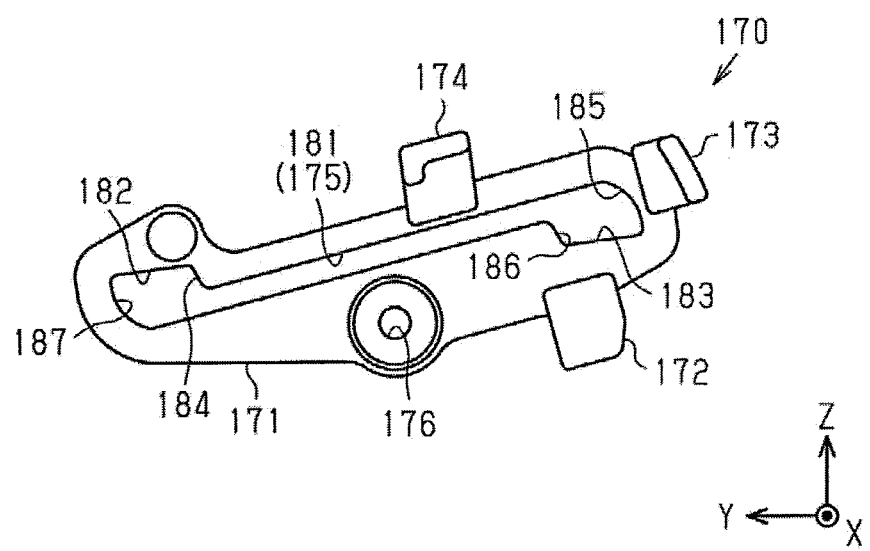
FIG. 13 is a side view of a front shoe check.

As illustrated in FIGS. 9 and 13, the front shoe check 170 includes: a main plate 171 that forms a flat plate; a second convex 172 that protrudes downward from the main plate 171; a first engagement 173 that protrudes rearward from the main plate 171; and a second engagement 174 that protrudes upward from the main plate 171.

The main plate 171 has: a second guide groove 175 extending in the longitudinal direction of the main plate 171; and a support hole 176 having the width direction as the axis direction. The second convex 172 is a part that can engage with the second recess 612 of the guide rail 60 (refer to FIG. 4). The first engagement 173 is a part that can contact with the first contact part 745 of the panel bracket 70 (refer to FIG. 6), and the second engagement 174 is a part that can contact with the second contact part 746 of the panel bracket 70 (refer to FIG. 6). In the front shoe check 170, the second convex 172, the first engagement 173, and the second engagement 174 engage with the guide rail 60 or the panel bracket 70 to restrict the movement of the front shoe check 170.

As illustrated in FIG. 13, the width of the middle part 181 in the longitudinal direction of the second guide groove 175 is generally equal to the thickness of the second guide shaft 83 of the drive shoe 80. On the other hand, the widths of the front edge and the rear edge of the second guide groove 175 are approximately twice the width of the middle part 181 of the second guide groove 175. In the following description, the front edge of the second guide groove 175 is also referred to as the first widening part 182, and the rear edge of the second guide groove 175 is also referred to as the second widening part 183.

The first widening part 182 has a first working surface 184 and a second release surface 187 that intersect with the second guide groove 175, and the second widening part 183 has a first release surface 185 and a second working surface 186 that intersect with the second guide groove 175. In the second guide groove 175, the first working surface 184 is a rear endface of the first widening part 182, and the second working surface 186 is a front endface of the second widening part 183. Whereas, the first release surface 185 is the rear endface of the second guide groove 175 and the second release surface 187 is the front endface of the second guide groove 175. For example, when the front shoe check 170 takes a posture as illustrated in FIG. 13, the first working surface 184, the first release surface 185, the second working surface 186, and the second release surface 187 are inclined downward in the rearward direction. Although, in this embodiment, the first working surface 184 and the second working surface 186 form a planar surface and the first release surface 185 and the second release surface 187 form a curved surface, the first working surface 184 and the second working surface 186 may form a curved surface and the first release surface 185 and the second release surface 187 may form a planar surface.

The support hole 176 is formed at a position shifted downward from the middle part in the longitudinal direction of the second guide groove 175 of the front shoe check 170. In a side view from the width direction, the support hole 176 is formed at a more forward position than the second convex 172, the first engagement 173 and the second engagement 174.

Then, as illustrated in FIGS. 8 and 9, the front shoe check 170 is coupled to the front shoe 150 when the check support shaft 103 is inserted in the width direction through the support hole 176 of the front shoe check 170 and the support hole 162 of the front shoe 150. At this time, the front shoe check 170 is arranged between the pair of front plates 151. As such, the front shoe check 170 can rotate around the axis line of the check support shaft 103 in relation to the front shoe 150 and can move along the guide rail 60 with the front shoe 150.

When the front shoe check 170 rotates around the axis line of the check support shaft 103, the front shoe 150 takes a posture where the middle part 181 of the second guide groove 175 overlaps the linear groove 164 of the front shoe 150 or a posture where the middle part 181 of the second guide groove 175 is inclined in relation to the linear groove 164 of the front shoe 150. Further, as illustrated in FIG. 8, the second guide shaft 83 of the drive shoe 80 is inserted in the width direction through the linear grooves 164 of the front shoe 150 and the second guide groove 175 of the front shoe check 170.

The following will describe the rear support mechanism 200.

Figure 14:
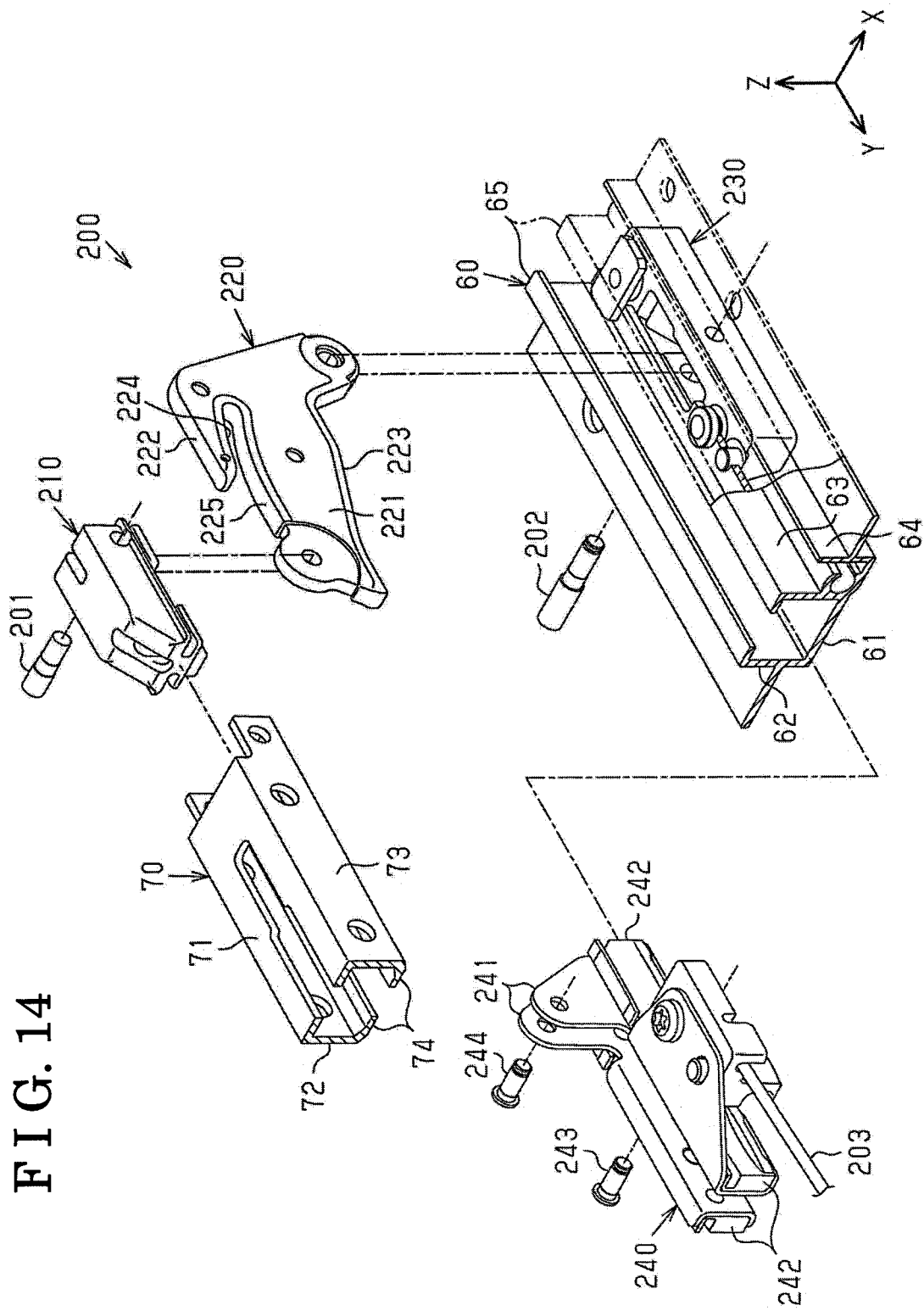
FIG. 14 is an exploded perspective view of a rear support mechanism.

As illustrated in FIG. 14, the rear support mechanism 200 includes: a slider 210 that slides with the panel bracket 70; a rear link 220 that supports the slider 210; a rear support part 230 that supports the rear link 220; and a rear shoe 240 that drives the rear link 220. Further, the rear support mechanism 200 includes: a rear connection shaft 201 that couples the slider 210 and the rear link 220; and a rear support shaft 202 that couples the rear link 220 and the rear support part 230. The rear support mechanism 200 also includes: a link cable 203 that transmits the power of the drive shoe 80 to the rear shoe 240; and a rear shoe check 250 that switches the state of power transmission that is transmitted from the drive shoe 80 to the rear shoe 240 (refer to FIG. 8).

The slider 210 is inserted into the panel bracket 70 in a state where the slider 210 is engaged with the sliding walls 74 of the panel bracket 70. When the panel bracket 70 moves in the front-rear direction, the slider 210 slides with the panel bracket 70.

The rear link 220 forms a flat plate. The rear link 220 has: a first part 221 extending from the proximal end toward the leading end; and a second part 222 extending as a branch from the first part 221. Further, the rear link 220 has: a first guide surface 223 to be pressed by the rear shoe 240; a second guide surface 224; and a third guide surface 225. The first guide surface 223 is a lower surface of the first part 221 when the rear link 220 is in a collapsed position as illustrated in FIG. 14. The second guide surface 224 is a lower surface of the second part 222 when the rear link 220 is in the collapsed position; the third guide surface 225 is an upper surface of the first part 221 when the rear link 220 is in the collapsed position. The first guide surface 223, the second guide surface 224, and the third guide surface 225 are inclined downward in the rearward direction when the rear link 220 is in the collapsed position. The leading edge of the rear link 220 is coupled to the rear edge of the slider 210 by the rear connection shaft 201. In this way, the rear link 220 of this embodiment supports the panel bracket 70 through the slider 210. The part of the panel bracket 70, which is supported by the rear link 220 through the slider 210, is at a more rearward position than the part of the panel bracket 70, which is supported by the front link 110.

The rear support part 230 is fixed to the bottom wall 61 in the rear end of the guide rail 60. The rear support part 230 is coupled to the proximal part of the rear link 220 by the rear support shaft 202. The rear shoe 240 has: a pair of rear plates 241 arranged with a gap in the width direction; a plurality of rear sliding parts 242 installed on the rear plates 241; and a third guide shaft 243 and a fourth guide shaft 244 that couple the pair of rear plates 241 in the width direction. The third guide shaft 243 couples the lower parts of the pair of rear plates 241 in the width direction and the fourth guide shaft 244 couples the upper parts of the pair of rear plates 241 in the width direction. Then, the rear shoe 240 is inserted into the guide rail 60 in a state where the rear sliding parts 242 are engaged with the sliding walls 65 of the guide rail 60. In a state where the rear shoe 240 is inserted into the guide rail 60, the third guide shaft 243 is hidden behind of the guide rail 60 and the fourth guide shaft 244 is protruded from the guide rail 60 in a side view from the width direction. Further, the rear shoe 240 holds the first part 221 of the rear link 220 with the third guide shaft 243 and the fourth guide shaft 244.

The link cable 203 is a power transmission member that transmits both pulling and pressing power from the drive shoe 80 to the rear shoe 240. The link cable 203 connects the drive shoe 80 and the rear shoe 240 in the front-rear direction. As such, in a state where the drive shoe 80 and the rear shoe 240 are connected through the link cable 203, when the drive shoe 80 moves rearward, the rear shoe 240 moves rearward, and when the drive shoe 80 moves forward, the rear shoe 240 moves forward.

As illustrated in FIG. 8, the rear shoe check 250 has: a connection part 251 to which the leading end of the link cable 203 is connected; and a fifth guide shaft 252 that has the width direction as the axis direction. The fifth guide shaft 252 is a part to be engaged with the third guide groove 85 of the drive shoe 80 and the third recess 641 of the guide rail 60. When the rear shoe check 250 is engaged with the drive shoe 80, the power of the drive shoe 80 is transmitted to the rear shoe 240. Whereas, when the rear shoe check 250 is not engaged with the drive shoe 80, the power of the drive shoe 80 is not transmitted to the rear shoe 240.

The operation of this embodiment will be described.

First, with reference to FIGS. 15 to 19, the operation of the movable panel 40 will be briefly described. FIGS. 15 to 19 illustrate the sunroof apparatus 30 by dividing at the center in the front-rear direction.

Figure 15:
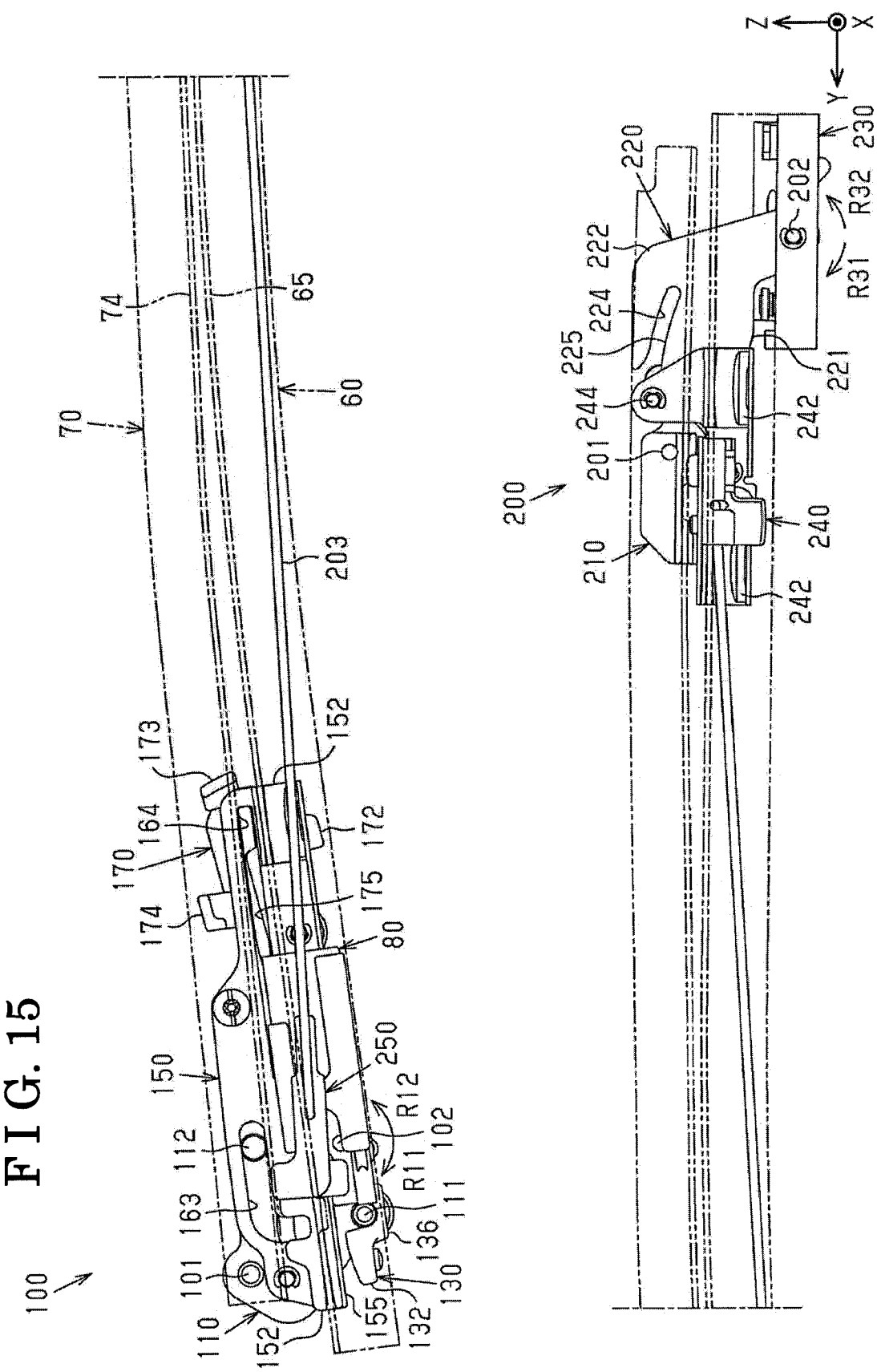
FIG. 15 is a side view of the sunroof apparatus when the movable panel is arranged in a full-close position.
Figure 16:
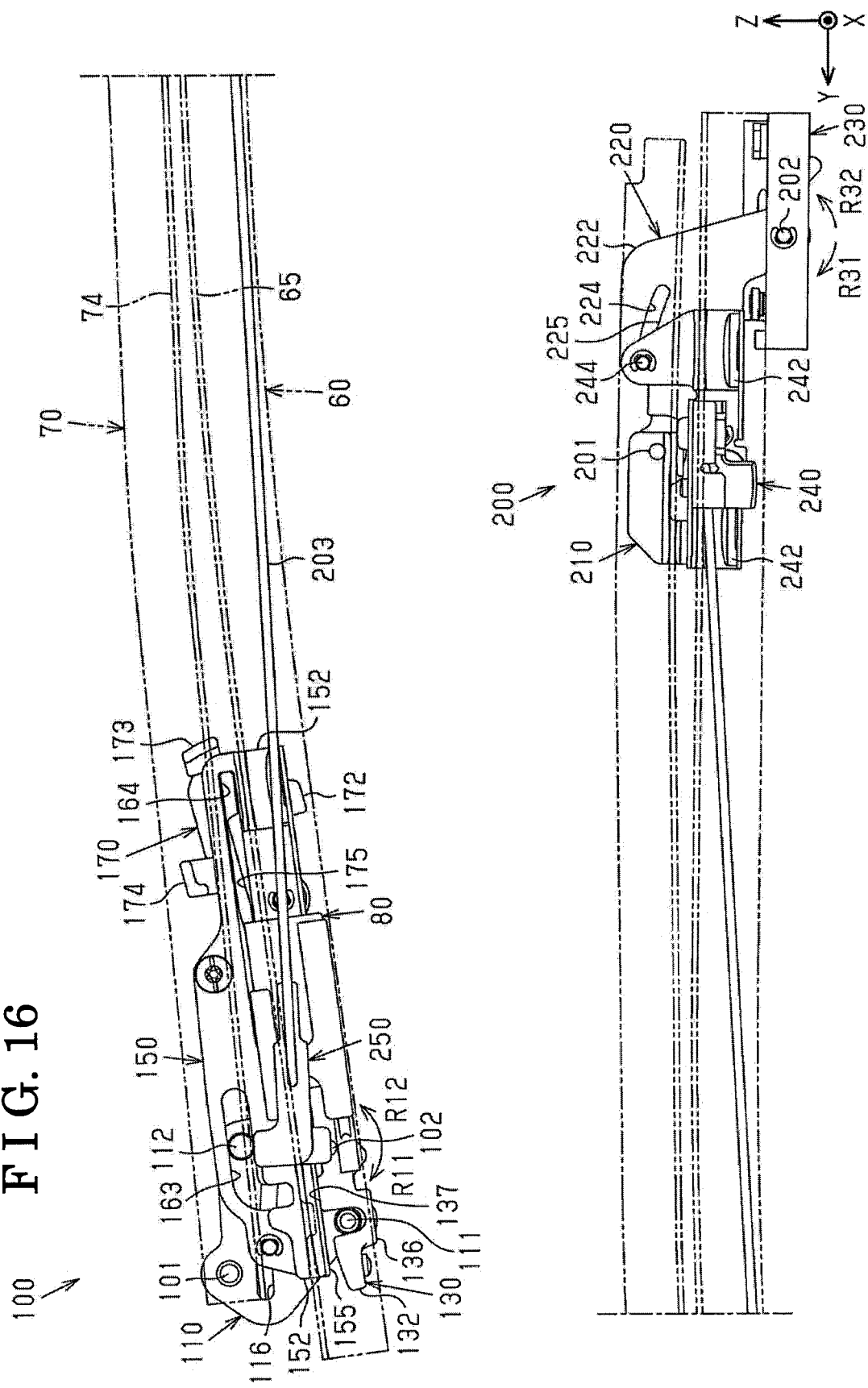
FIG. 16 is a side view of the sunroof apparatus when the movable panel is arranged in a second front-up position.

As illustrated in FIG. 15, in a state where the movable panel 40 is arranged in the "full-close position" where the movable panel 40 fully closes the opening 21, when the drive shoe 80 moves rearward, the power of the drive shoe 80 is transmitted to the front support mechanism 100 and the rear support mechanism 200. Then, as illustrated in FIGS. 15 and 16, the front link 110 rotates in the first rotation direction R11 and the movable panel 40 moves from the full-close position to the "second front-up position" where the front edge is slightly raised from the full-close position. In other words, the movable panel 40 performs a second front-up operation. When the movable panel 40 performs the second front-up operation, the power of the drive shoe 80 is transmitted to the rear shoe 240 of the rear support mechanism 200 but not to the rear link 220 of the rear support mechanism 200. As such, when the movable panel 40 performs the second front-up operation, most of the power of the drive shoe 80 is transmitted to the front support mechanism 100.

Figure 17:
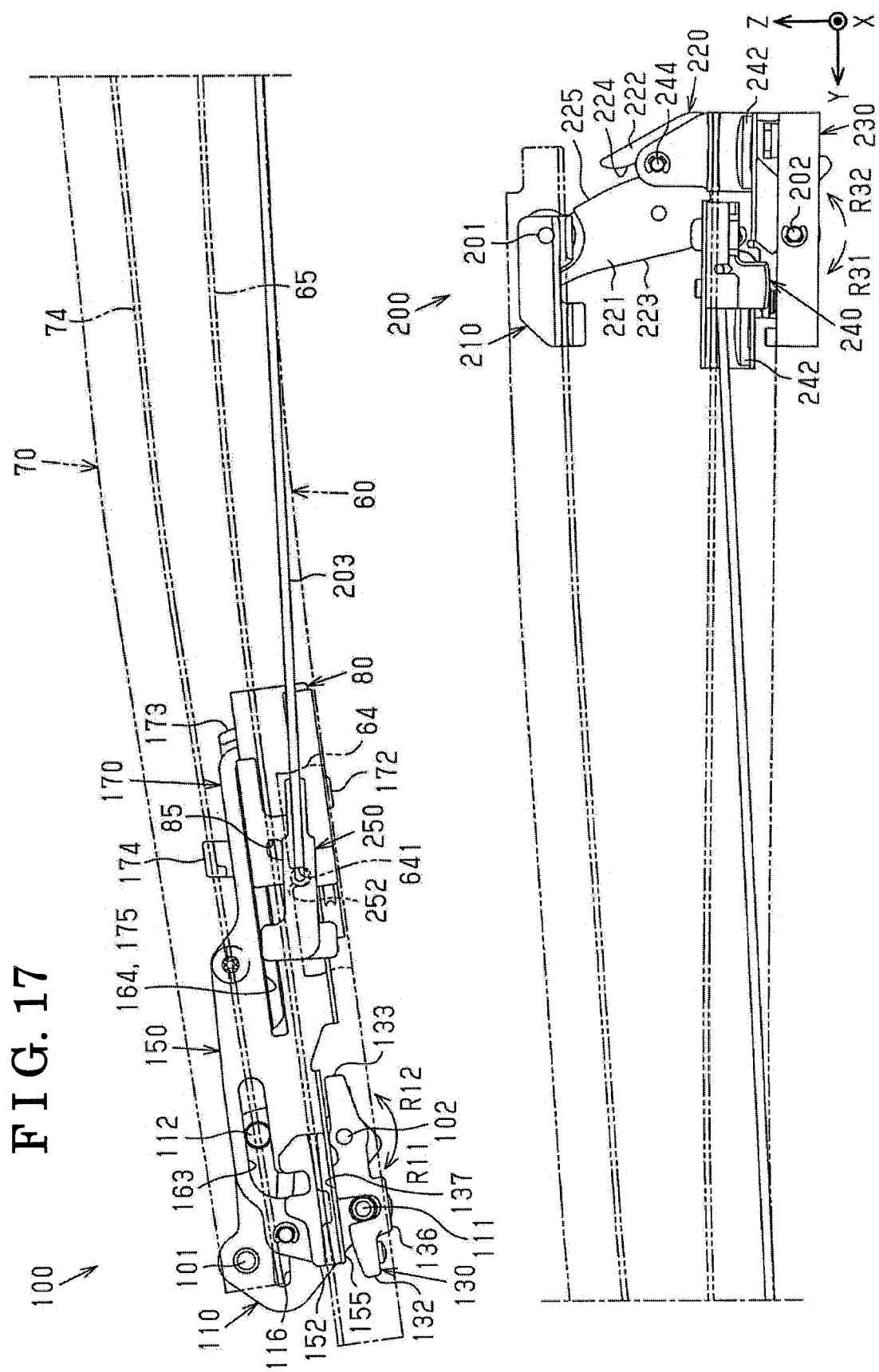
FIG. 17 is a side view of the sunroof apparatus when the movable panel is arranged in a rear-up position.

As illustrated in FIG. 16, in a state where the movable panel 40 is arranged in the second front-up position, when the drive shoe 80 moves rearward, the power of the drive shoe 80 is transmitted only to the rear support mechanism 200. Then, as illustrated in FIGS. 16 and 17, the rear link 220 rotates in the first rotation direction R31 and the movable panel 40 moves from the second front-up position to the "rear-up position" where the rear edge is raised from the second front-up position. In other words, the movable panel 40 performs a rear tilt-up operation.

Figure 18:
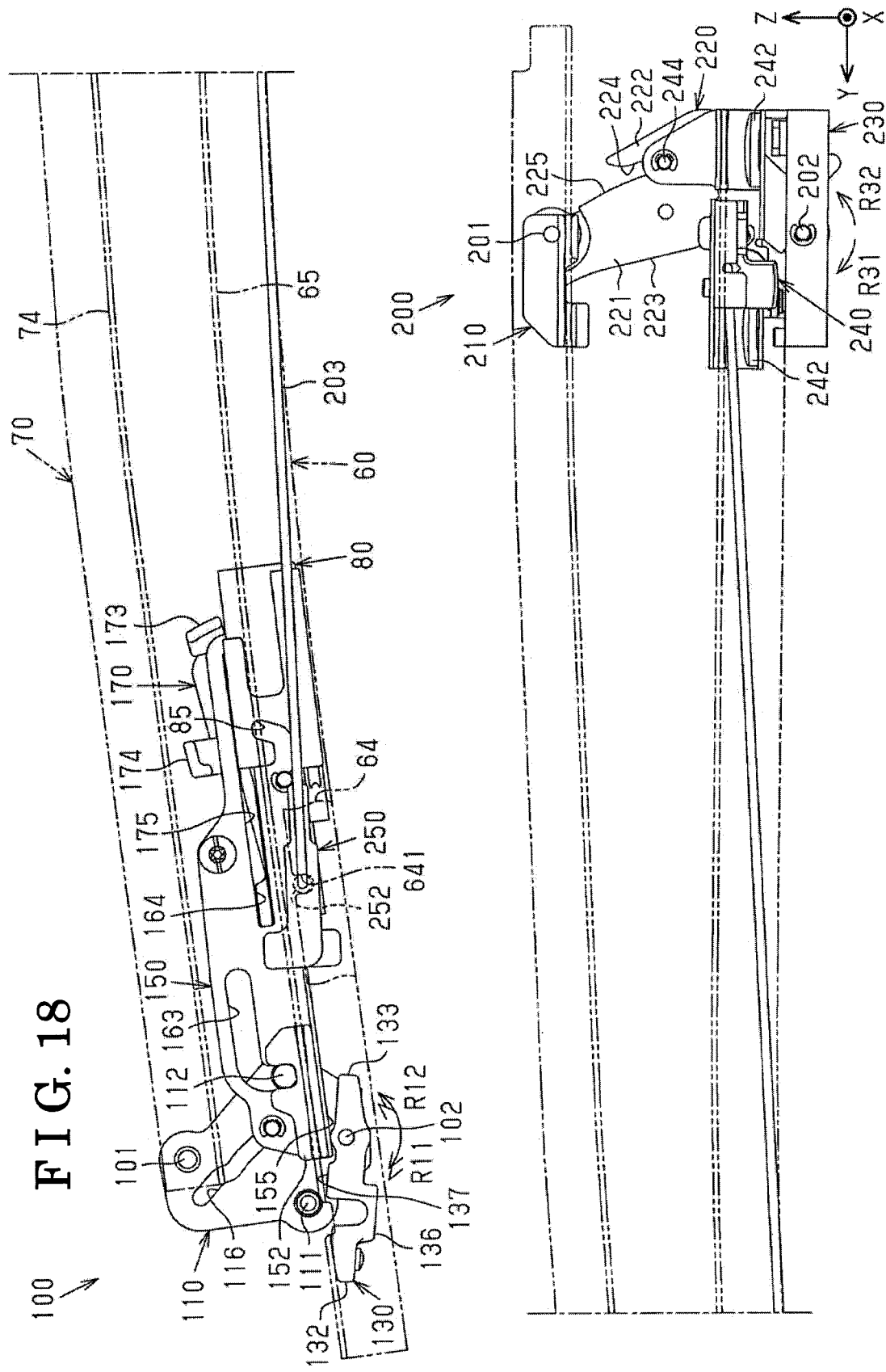
FIG. 18 is a side view of the sunroof apparatus when the movable panel is arranged in a first front-up position.

As illustrated in FIG. 17, in a state where the movable panel 40 is arranged in the rear-up position, when the drive shoe 80 moves rearward, the power of the drive shoe 80 is transmitted only to the front support mechanism 100. Then, as illustrated in FIGS. 17 and 18, the front link 110 rotates in the first rotation direction R11 and the movable panel 40 moves from the rear-up position to the "second front-up position" where the front edge is raised from the rear-up position. In other words, the movable panel 40 performs the second front-up operation.

Figure 19:
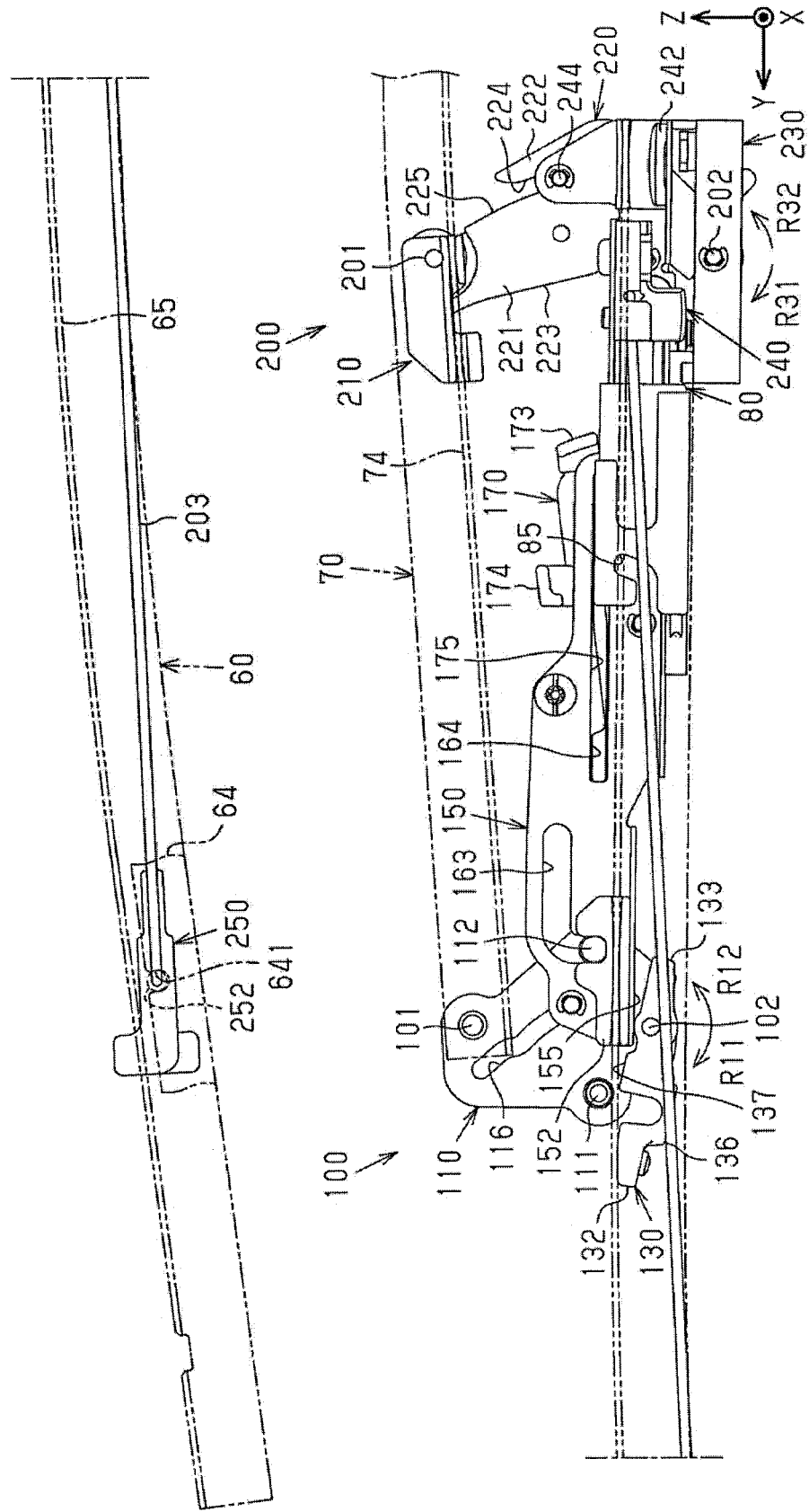
FIG. 19 is a side view of the sunroof apparatus when the movable panel is arranged in a full-open position.

As illustrated in FIG. 18, in a state where the movable panel 40 is arranged in the second front-up position, when the drive shoe 80 moves rearward, the power of the drive shoe 80 is transmitted only to the front support mechanism 100. Then, as illustrated in FIGS. 18 and 19, the front link 110 moves rearward and the movable panel 40 moves from the second front-up position to the "full-open position" where the movable panel 40 fully opens the opening 21. Thus, the movable panel 40 performs a slide operation in the rearward direction. In this embodiment, as illustrated in FIG. 19, the movable panel 40 arranged in the full-open position is positioned above the roof of the vehicle 10. In this point, the sunroof apparatus 30 of this embodiment can be called as an outer sliding type sunroof apparatus.

On the other hand, as illustrated in FIG. 19, in a state where the movable panel 40 is arranged in the full-open position, when the drive shoe 80 moves forward, the power of the drive shoe 80 is transmitted only to the front support mechanism 100. Then, as illustrated in FIGS. 19 and 18, the front link 110 moves forward and the movable panel 40 moves from the full-open position to the second front-up position. In other words, the movable panel 40 performs the slide operation in the forward direction.

As illustrated in FIG. 18, in a state where the movable panel 40 is arranged in the second front-up position, when the drive shoe 80 moves forward, the power of the drive shoe 80 is transmitted only to the front support mechanism 100. Then, as illustrated in FIGS. 18 and 17, the front link 110 rotates in the second rotation direction R12 and the movable panel 40 moves from the second front-up position to the rear-up position. In other words, the movable panel 40 performs a first front-down operation.

As illustrated in FIG. 17, in a state where the movable panel 40 is arranged in the rear-up position, when the drive shoe 80 moves forward, the power of the drive shoe 80 is transmitted only to the rear support mechanism 200. Then, as illustrated in FIGS. 17 and 16, the rear link 220 rotates in the second rotation direction R32, and the movable panel 40 moves from the rear-up position to the "first front-up position (front-up position)." In other words, the movable panel 40 performs a rear-down operation.

As illustrated in FIG. 16, in a state where the movable panel 40 is arranged in the second front-up position, when the drive shoe 80 moves forward, the power of the drive shoe 80 is transmitted to the front support mechanism 100 and the rear support mechanism 200. Then, as illustrated in FIGS. 16 and 15, the front link 110 rotates in the second rotation direction R12 and the movable panel 40 moves from the second front-up position to the full-close position. In other words, the movable panel 40 performs a second front-down operation. When the movable panel 40 performs the second front-down operation, the power of the drive shoe 80 is transmitted to the rear shoe 240 of the rear support mechanism 200 but not to the rear link 220 of the rear support mechanism 200. As such, when the movable panel 40 performs the second front-down operation, most of the power of the drive shoe 80 is transmitted to the front support mechanism 100.

In the following description, the second front-up operation and the second front-down operation of the movable panel 40 are collectively referred to as the "second front-tilt operation," the rear-up operation and the rear-down operation of the movable panel 40 are collectively referred to as the "rear-tilt operation," and the first front-up operation and the first front-down operation of the movable panel 40 are collectively referred to as the "first front-tilt operation." In addition, the second front-tilt operation and the rear tilt operation correspond to examples of the "first tilt operation," and the first front-tilt operation corresponds to an example of the "second tilt operation."

Further, a movement range of the drive shoe 80 when the movable panel 40 performs the second front-tilt operation is defined as the "first movement range A1," a movement range of the drive shoe 80 when the movable panel 40 performs the rear-tilt operation is defined as the "second movement range A2," a movement range of the drive shoe 80 when the movable panel 40 performs the first front-tilt operation is defined as the "third movement range A3," and a movement range of the drive shoe 80 when the movable panel 40 performs the slide operation is defined as the "fourth movement range A4." The movement ranges of the drive shoe 80 sequentially line up from the first movement range A1, second movement range A2, third movement range A3, and fourth movement range A4 toward the rear end of the guide rail 60.

Figure 23:
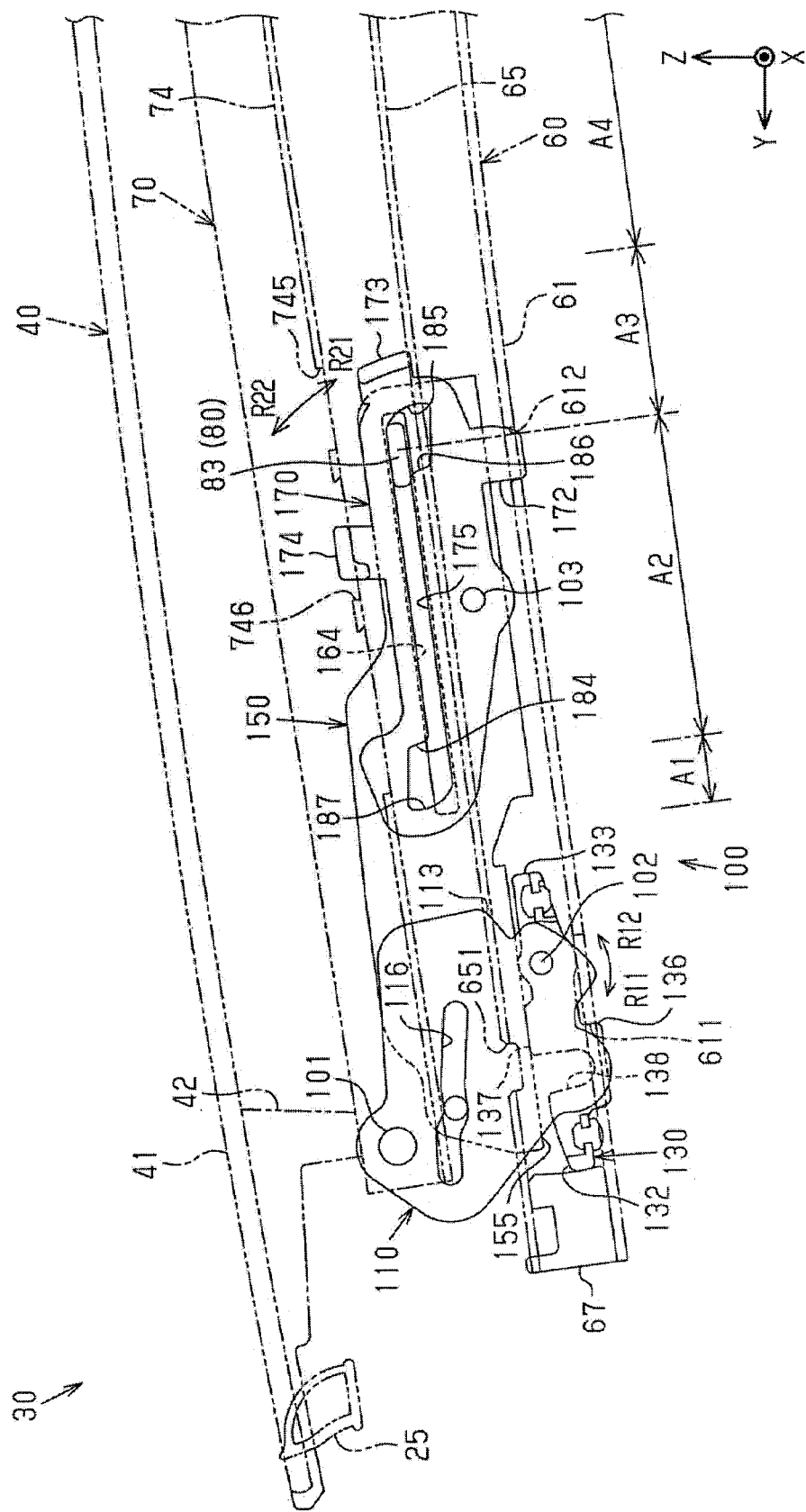
FIG. 23 is a side view of the front support mechanism when the drive shoe is positioned near the rear end of the second movement range.
Figure 24:
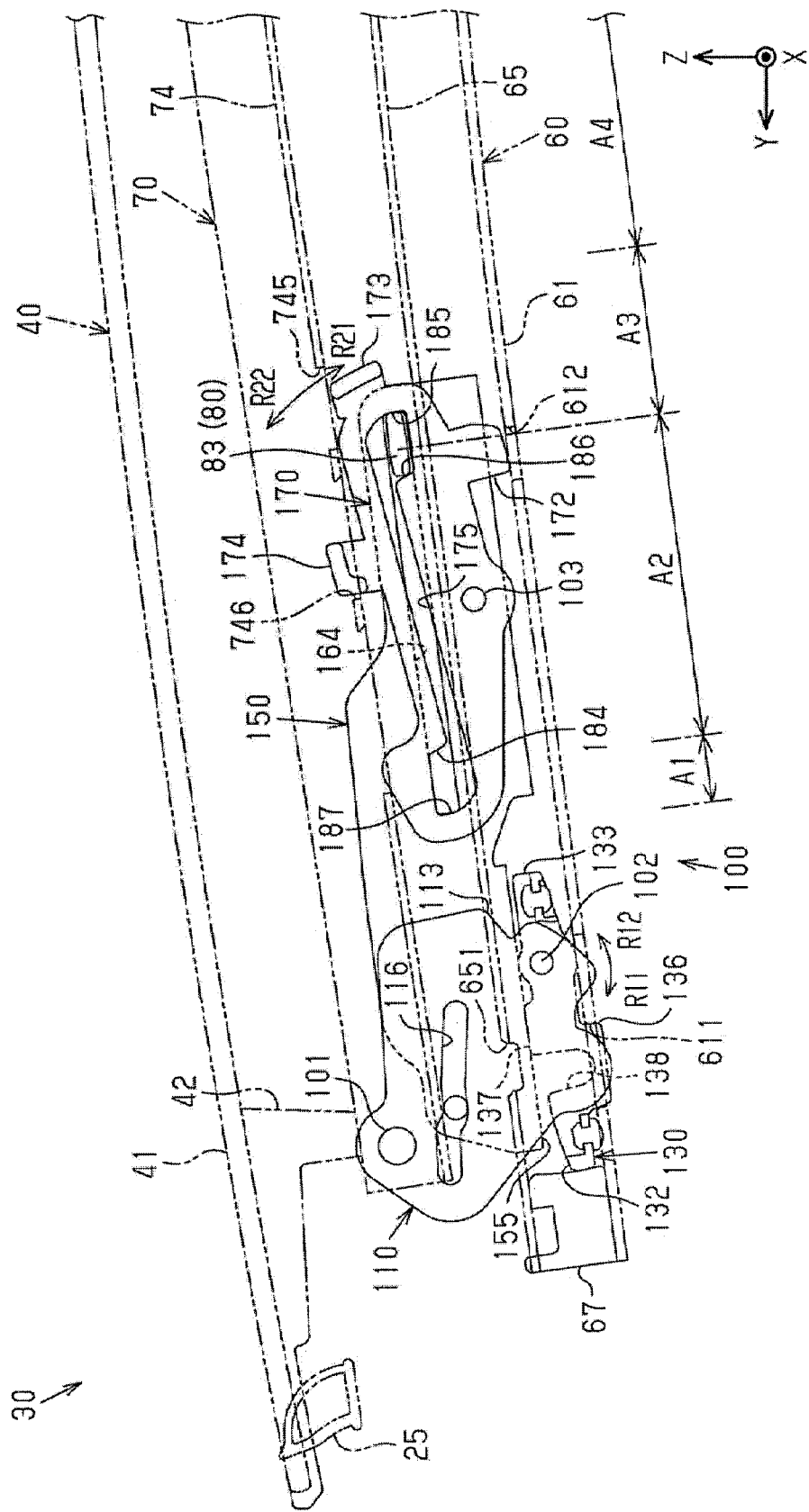
FIG. 24 is a side view of the front support mechanism when the drive shoe is positioned near the front end of a third movement range.
Figure 25:
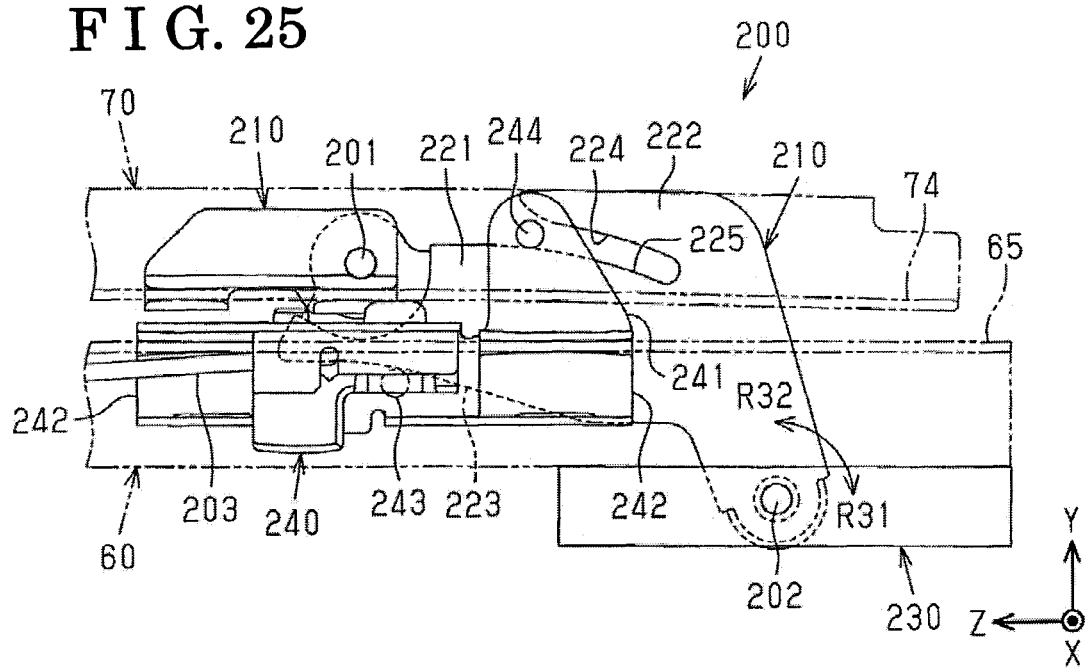
FIG. 25 is a partially enlarged view of FIG. 16, as well as, a side view of the rear support mechanism when the drive shoe is positioned at the front end of the second movement range.
Figure 26:
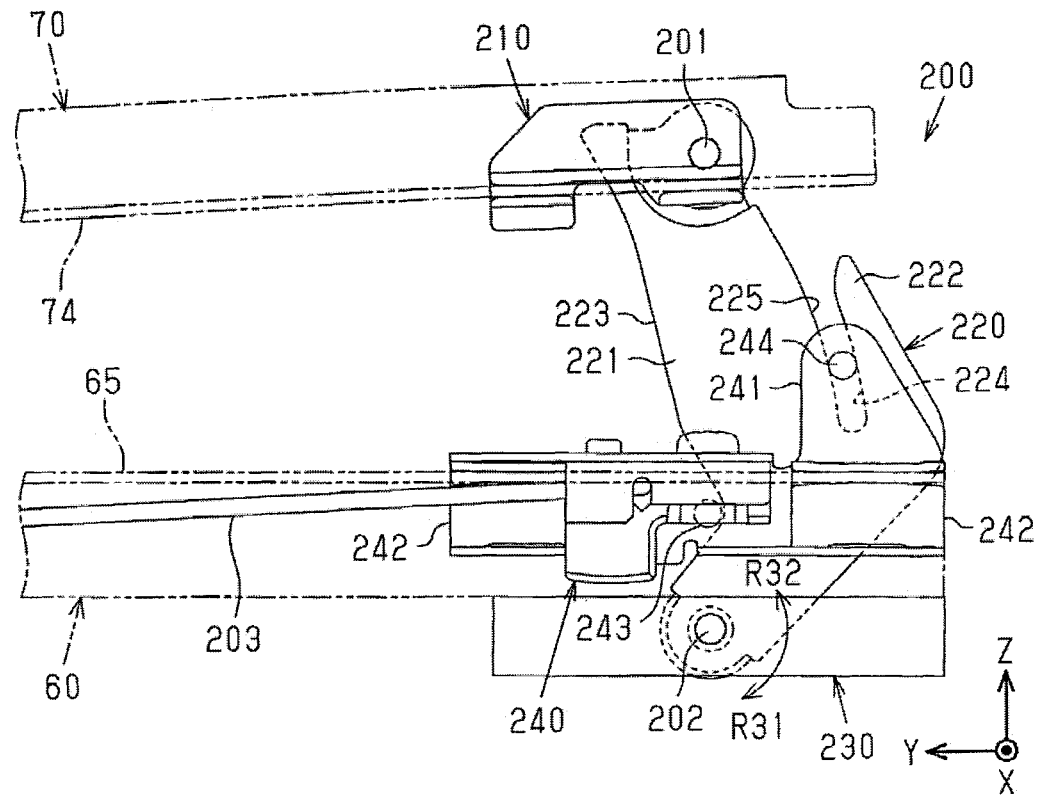
FIG. 26 is a partially enlarged view of FIG. 17, as well as, a side view of the rear support mechanism when the drive shoe is positioned at the rear end of the second movement range.

With reference to FIGS. 20 to 29, the operation of the front support mechanism 100 and the rear support mechanism 200 will be described. FIGS. 20 to 24, 27 to 29 are cross section views of the front support mechanism 100 without illustration of some components and hatching; FIGS. 25 and 26 are side views of the rear support mechanism 200 without illustration of some components. Further, FIGS. 20 to 24 illustrate the weather strip 25 without size reduction or modification to clarify the position relationship between the weather strip 25 and the front edge of the movable panel 40.

First, the following will describe the operation of the front support mechanism 100 when the drive shoe 80 moves rearward in the first movement range A1 and the second movement range A2 to cause the movable panel 40 perform the open operation.

Figure 20:
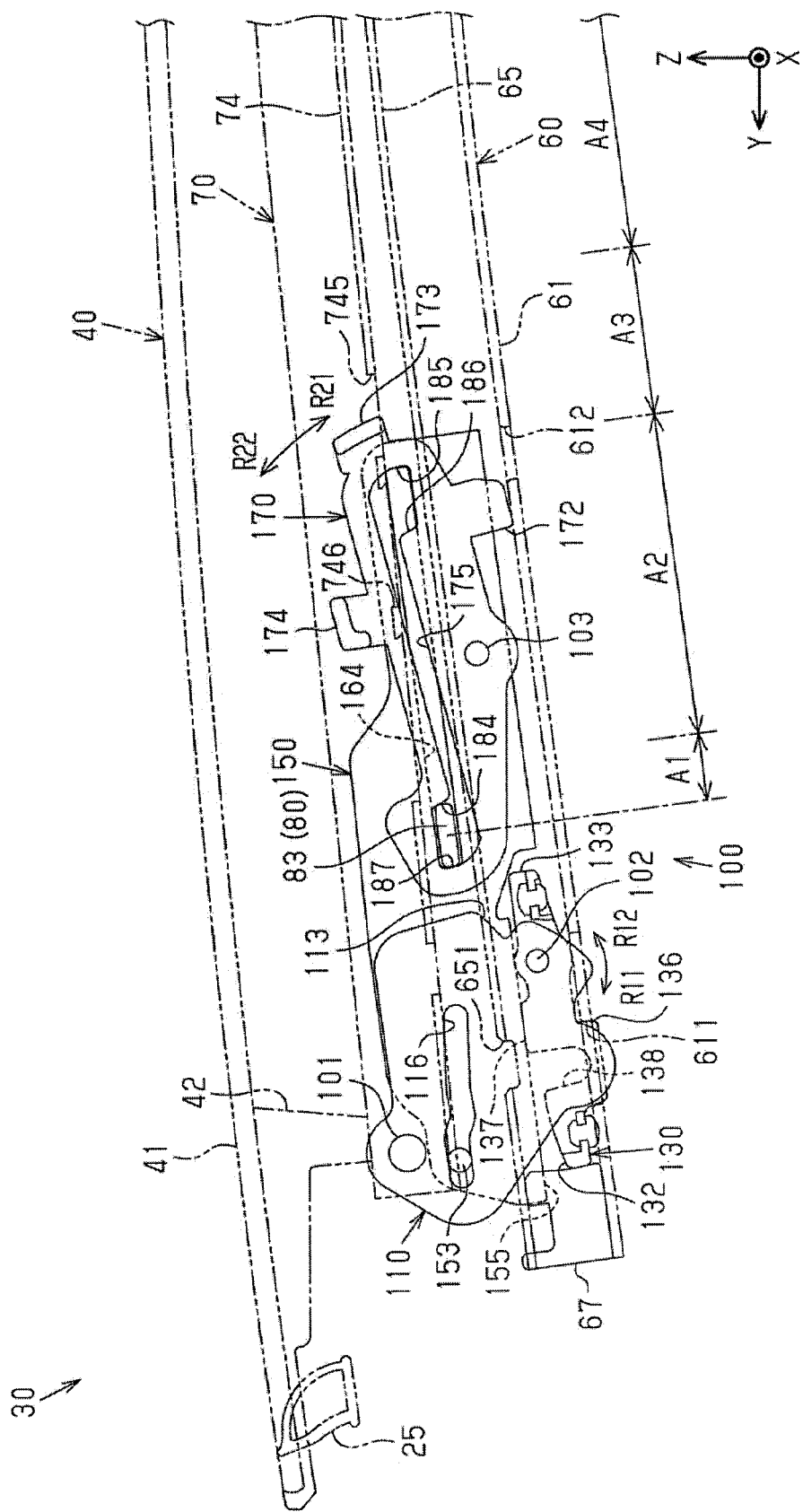
FIG. 20 is a partially enlarged view of FIG. 15, as well as, a side view of the front support mechanism when a drive shoe is positioned at the front end of a first movement range.

FIG. 20 illustrates the front support mechanism 100 when the movable panel 40 is positioned in the full-close position. When the movable panel 40 is in the full-close position, the drive shoe 80 is positioned at the front end of the first movement range A1.

The drive shoe 80 is coupled to the front shoe check 170 through the second guide shaft 83, and the front shoe check 170 is coupled to the front shoe 150 through the check support shaft 103. In addition, the front shoe 150 is coupled to the front link 110 through the first guide shaft 153.

As such, when the drive shoe 80 is positioned at the front end of the first movement range A1, the front shoe 150 is arranged at the "first position" that is a position closest to the front end among the movement ranges along the guide rail 60. When the front shoe 150 is arranged at the first position, the front link 110 is arranged at a position closest to the front end among the movement ranges along the guide rail 60. In addition, the front link 110 is arranged in the "full-close corresponding position" where the front link 110 is rotated in the second rotation direction R12 around the axis line of the front support shaft 102. With regard to the front link 110, the full-close corresponding position is a position where the front connection shaft 101 is arranged closest to the front end of the guide rail 60, as well as, the bottom wall 61 of the guide rail 60.

The front link 110 is coupled to the panel bracket 70 through the front connection shaft 101, and the movable panel 40 is fixed to the panel bracket 70. In this way, in a state where the rear link 220 is arranged in the collapsed position, when the front link 110 is arranged in the full-close corresponding position, the movable panel 40 is arranged in the full-close position.

As illustrated in FIG. 20, when the front shoe 150 is arranged at the first position, the front shoe 150 and the front shoe check 170 can move along the guide rail 60. Whereas, as illustrated in FIG. 20, when the front link 110 is arranged in the full-close corresponding position, the first convex 136 of the front link check 130 engages with the first recess 611 of the guide rail 60. At this point, the front link 110 and front link check 130 cannot move along the guide rail 60.

Figure 21:
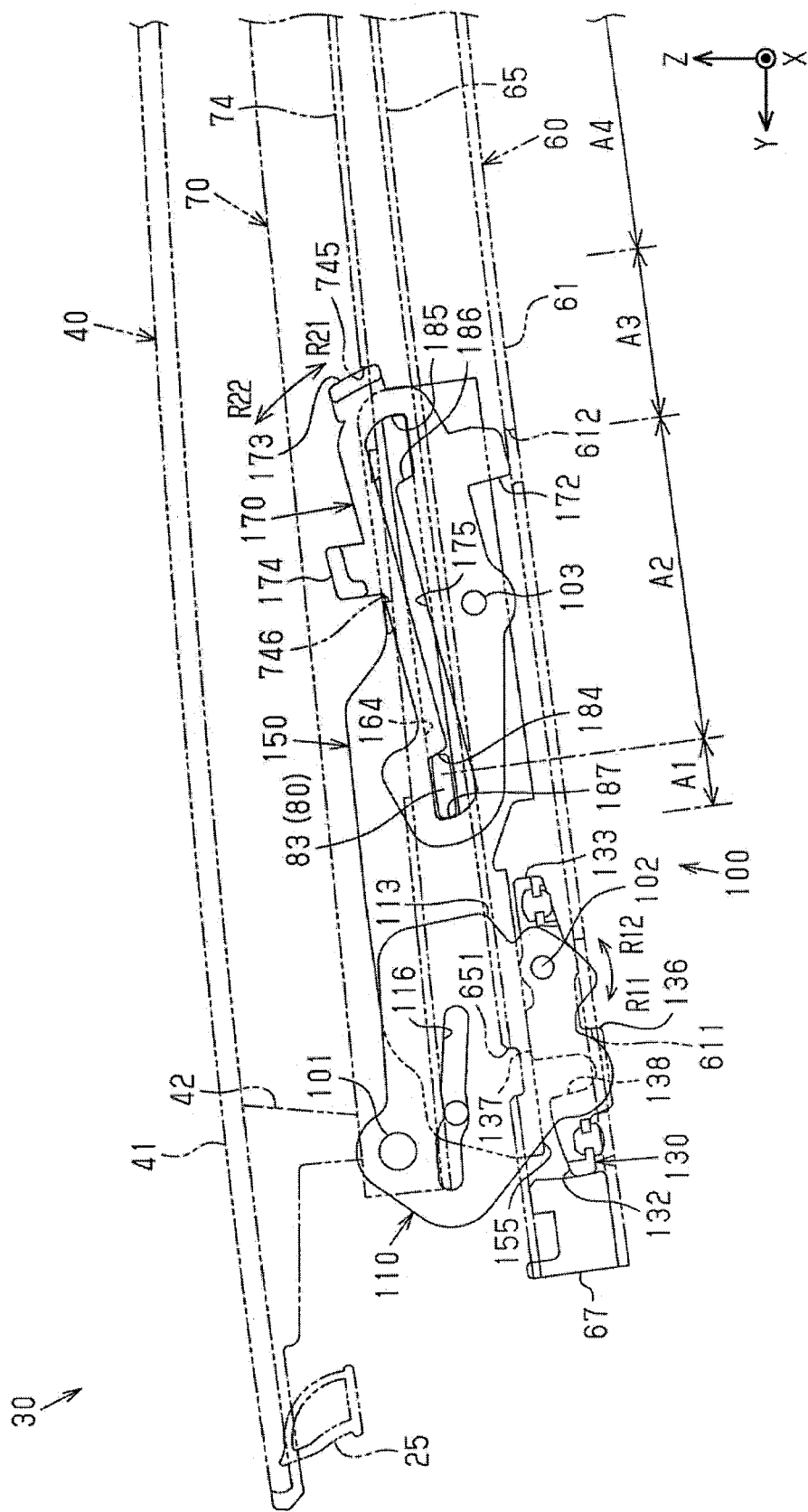
FIG. 21 is a side view of the front support mechanism when the drive shoe is positioned near the rear end of the first movement range.

As illustrated in FIGS. 20 and 21, when the drive shoe 80 moves rearward in the first movement range A1, the second guide shaft 83 of the drive shoe 80 presses the first working surface 184 of the second guide groove 175 of the front shoe check 170 in the rearward direction. Then, the power that the second guide shaft 83 of the drive shoe 80 presses the front shoe check 170 in the rearward direction is transmitted to the front shoe 150 through the check support shaft 103. As the result, the front shoe 150 moves with the front shoe check 170 in the rearward direction.

When the front shoe 150 moves rearward from the first position, the first guide shaft 153 of the drive shoe 80 slides with the first guide groove 116 of the front link 110. However, even when the front shoe 150 moves rearward from the first position, the front link 110 is restricted from moving rearward by the front link check 130. Accordingly, in conjunction with the rearward movement of the front shoe 150, the front link 110 rotates in the first rotation direction R11 without moving rearward. With regard to the front link 110, the first rotation direction R11 is a direction in which the front link 110 rises.

In addition, the first working surface 184 being pressed by the second guide shaft 83 of the drive shoe 80 is inclined in a direction toward the bottom wall 61 of the guide rail 60 as the first working surface 184 advances in the direction of the movement of the drive shoe 80. As such, when the drive shoe 80 moves rearward in the first movement range A1, a moment of power (hereinafter, referred to as the "moment") for rotating the front shoe check 170 in the first rotation direction R21 applies to the front shoe check 170. The first rotation direction R21 is the rotation direction that causes the second convex 172 of the front shoe check 170 to approach the bottom wall 61 of the guide rail 60. In this way, when the drive shoe 80 moves rearward in the first movement range A1, the second convex 172 of the front shoe check 170 slides with the bottom wall 61 of the guide rail 60.

Further, when the drive shoe 80 moves rearward in the first movement range A1, the second plate 155 of the front shoe 150 slides with the sliding surface 137 of the front lever 132 of the front link check 130. As such, the front link check 130 is restricted from moving in a manner raising the front lever 132. In other words, the front link check 130 is restricted from rotating in the first rotation direction R11. In this way, when the drive shoe 80 moves rearward in the first movement range A1, the first convex 136 of the front link check 130 remains to be engaged with the first recess 611 of the guide rail 60.

As illustrated in FIG. 21, when the drive shoe 80 has moved to near the rear end of the first movement range A1, the front shoe 150 is arranged at the "second position" and the front link 110 is arranged in the "second front-up corresponding position." In addition, in a state where the rear link 220 is arranged in the collapsed position, when the front link 110 is arranged in the second front-up corresponding position, the movable panel 40 is arranged in the second front-up position.

As illustrated in FIG. 21, when the front shoe 150 is arranged at the second position, the first engagement 173 of the front shoe check 170 becomes in contact with the first contact part 745 of the panel bracket 70, which prevents the front shoe check 170 from moving rearward. Whereas, the second convex 172 of the front shoe check 170 faces the second recess 612 of the guide rail 60. As such, when the drive shoe 80 moves rearward from near the rear end of the first movement range A1, the front shoe check 170 to which the moment of the first rotation direction R21 applies rotates in the first rotation direction R21.

With regard to the front link 110, the second front-up position is a position that is slightly rotated in the first rotation direction R11 from the full-close corresponding position and where the front connection shaft 101 is moved rearward and upward than the full-close corresponding position. As such, when the drive shoe 80 moves rearward in the first movement range A1, the movable panel 40 performs the second front-up operation. It should be noted that, as illustrated in FIG. 21, when the movable panel 40 performs the second front-up operation, the compression amount of the weather strip 25 contacting with the front edge of the movable panel 40 is reduced.

Figure 22:
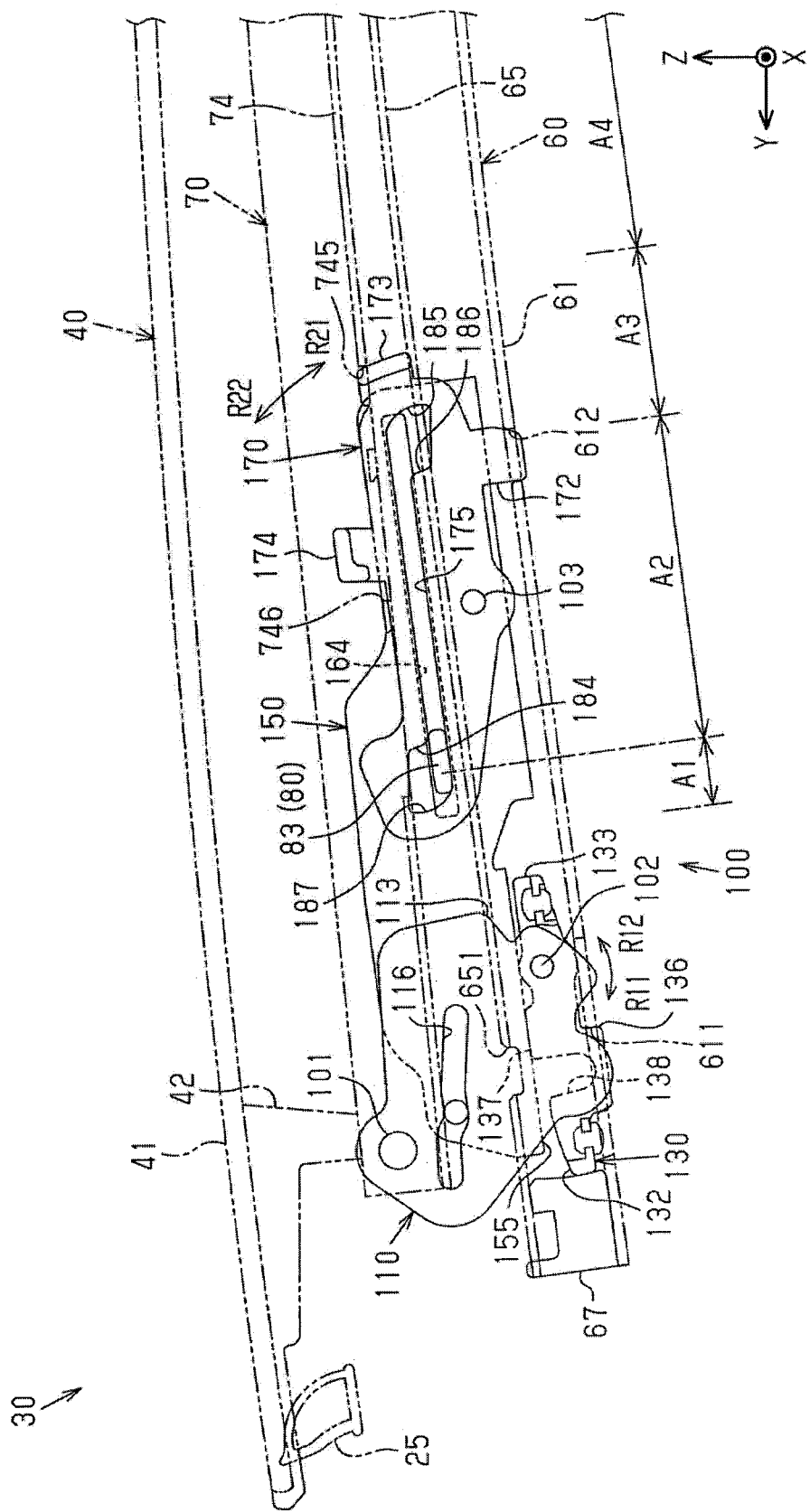
FIG. 22 is a side view of the front support mechanism when the drive shoe is positioned near the front end of a second movement range.

As illustrated in FIG. 22, when the drive shoe 80 moves rearward from the front end of the second movement range A2, the front shoe check 170 ends rotating in the first rotation direction R21, and the second convex 172 of the front shoe check 170 engages with the second recess 612 of the guide rail 60. Then, in a side view from the width direction, the second guide groove 175 of the front shoe check 170 overlaps the linear groove 164 of the front shoe 150.

As such, as illustrated in FIGS. 22 and 23, when the drive shoe 80 moves rearward in the second movement range A2, the second guide shaft 83 of the drive shoe 80 moves along the linear groove 164 of the front shoe 150 and the second guide groove 175 of the front link check 130. In other words, the power of the drive shoe 80 cannot be transmitted to the front shoe check 170 or the front shoe 150. Thus, when the drive shoe 80 moves rearward in the second movement range A2, the drive shoe 80 remains to be arranged at the second position, the front shoe 150 remains to be arranged at the second position, and the front link 110 remains to be arranged in the second front-up corresponding position.

As illustrated in FIG. 23, when the drive shoe 80 has moved to near the rear end of the second movement range A2, the second guide shaft 83 of the drive shoe 80 becomes in contact with the first release surface 185 of the second guide groove 175 of the front shoe check 170. Since the first release surface 185 is inclined toward the bottom wall 61 of the guide rail 60 as it advances in the movement direction of the drive shoe 80, a moment for rotating the front shoe check 170 in the second rotation direction R22 applies to the front shoe check 170. The second rotation direction R22 is a rotation direction that causes the second convex 172 of the front shoe check 170 to separate away from the bottom wall 61 of the guide rail 60. As such, when the drive shoe 80 moves rearward from near the rear end of the second movement range A2, the front shoe check 170 rotates in the second rotation direction R22.

As illustrated in FIG. 24, when the drive shoe 80 moves forward from the front end of the third movement range A3, the front shoe check 170 ends rotating in the second rotation direction R22, and the second convex 172 of the front shoe check 170 disengages from the second recess 612 of the guide rail 60. Accordingly, the power of the drive shoe 80 can be transmitted to the front shoe check 170, which allows the front shoe 150 and the front shoe check 170 to move rearward.

Next, the following will describe the operation of the rear support mechanism 200 when the drive shoe 80 moves rearward in the second movement range A2 to cause the movable panel 40 to perform the open operation.

FIG. 25 illustrates the rear support mechanism 200 when the movable panel 40 is arranged in the second front-up position. FIG. 25 is a partially enlarged view of FIG. 16 and, while not shown in the drawing, indicates that the drive shoe 80 is positioned at the front end of the second movement range A2. As illustrated in FIG. 25, when the drive shoe 80 is positioned at the front end of the second movement range A2, the rear link 220 is arranged in the "collapsed position" where the slider 210 is arranged at the lowest and most forward position. The collapsed position is also a position where the rear link 220 is rotated the most in the second rotation direction R32 around the axis line of the rear support shaft 202.

When the drive shoe 80 moves rearward in the second movement range A2, the drive shoe 80 presses the rear shoe 240 in the rearward direction through the link cable 203. Then, the third guide shaft 243 of the rear shoe 240 slides with the first guide surface 223 of the rear link 220, and the fourth guide shaft 244 of the rear shoe 240 slides with the second guide surface 224 of the rear link 220. Accordingly, as the rear shoe 240 moves rearward, the rear link 220 rotates in the first rotation direction R31.

When the drive shoe 80 moves up to the rear end of the second movement range A2, as illustrated in FIG. 26, the rear link 220 is arranged in the standing position. With regard to the rear link 220, the standing position is a position where the slider 210 is arranged at the upmost and most rearward position. Accordingly, in a state where the front link 110 is arranged in the second front-up corresponding position, when the rear link 220 is arranged in the standing position, the movable panel 40 is arranged in the rear-up position.

As illustrated in FIG. 17, when the drive shoe 80 moves up to the rear end of the second movement range A2, the fifth guide shaft 252 of the rear shoe check 250 moves from the third guide groove 85 of the drive shoe 80 to the third recess 641 of the guide rail 60. Accordingly, the drive shoe 80 and the rear shoe check 250 are disengaged, which prevents the power of the drive shoe 80 from being transmitted to the rear shoe check 250. In this way, when the drive shoe 80 moves rearward in the third movement range A3 and the fourth movement range A4, the fifth guide shaft 252 of the rear shoe 240 remains to be engaged with the third recess 641 of the guide rail 60 and the rear link 220 remains to be arranged in the standing position.

Finally, the following will describe the operation of the front support mechanism 100 when the drive shoe 80 moves rearward in the third movement range A3 and the fourth movement range A4 to cause the movable panel 40 to perform the open operation.

As illustrated in FIG. 24, when the drive shoe 80 moves rearward in the third movement range A3, the third guide shaft 243 of the drive shoe 80 presses the first release surface 185 of the second guide groove 175 of the front shoe check 170 in the rearward direction. Then, the power that the second guide shaft 83 of the drive shoe 80 presses the front shoe check 170 in the rearward direction is transmitted to the front shoe 150 through the check support shaft 103, and the front shoe 150 moves rearward. In other words, when the drive shoe 80 moves rearward in the third movement range A3, the front shoe 150 starts moving in the rearward direction again and the front link 110 starts rotating in the first rotation direction R11 again.

Figure 27:
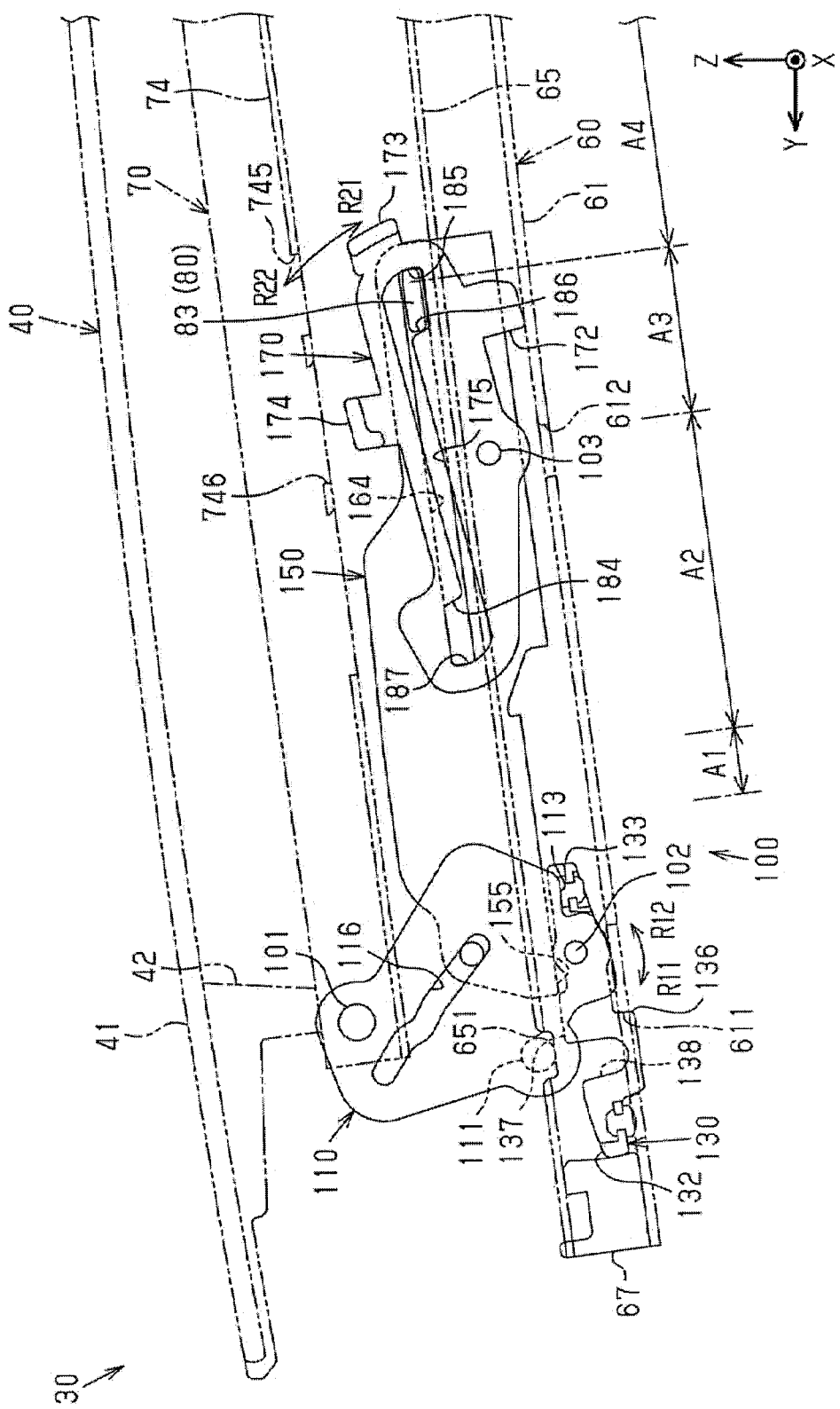
FIG. 27 is a side view of the front support mechanism when the drive shoe is positioned before the rear end of the third movement range.

As illustrated in FIG. 27, when the drive shoe 80 has moved up to a position before the rear end of the third movement range A3, the front shoe 150 is arranged in a "third position" and the front link 110 is arranged in the "check switching position." When the front shoe 150 is arranged at the third position, the second plate 155 of the front link check 150 stops sliding with the sliding surface 137 of the front lever 132 of the front link check 130. Thus, the front link check 130 is enabled to rotate in the first rotation direction R11. In addition, when the front link 110 is arranged in the check switching position, the pressing surface 113 of the front link 110 becomes in contact with the rear lever 133 of the front link check 130.

Then, in this embodiment, at timing when the pressing surface 113 of the front link 110 becomes in contact with the rear lever 133 of the front link check 130, the second plate 155 of the front shoe 150 stops sliding with the sliding surface 137 of the front lever 132 of the front link check 130. Then, when the front shoe 150 moves rearward from the third position, the pressing surface 113 of the front link 110 presses the rear lever 133 of the front link check 130, and the front link check 130 starts rotating in the first rotation direction R11.

Further, when the front link 110 rotates from the second front-up corresponding position to the check switching position, the first holding shaft 111 of the front link 110 moves outside the guide rail 60 through the first cutouts 651 of the guide rail 60.

Figure 28:
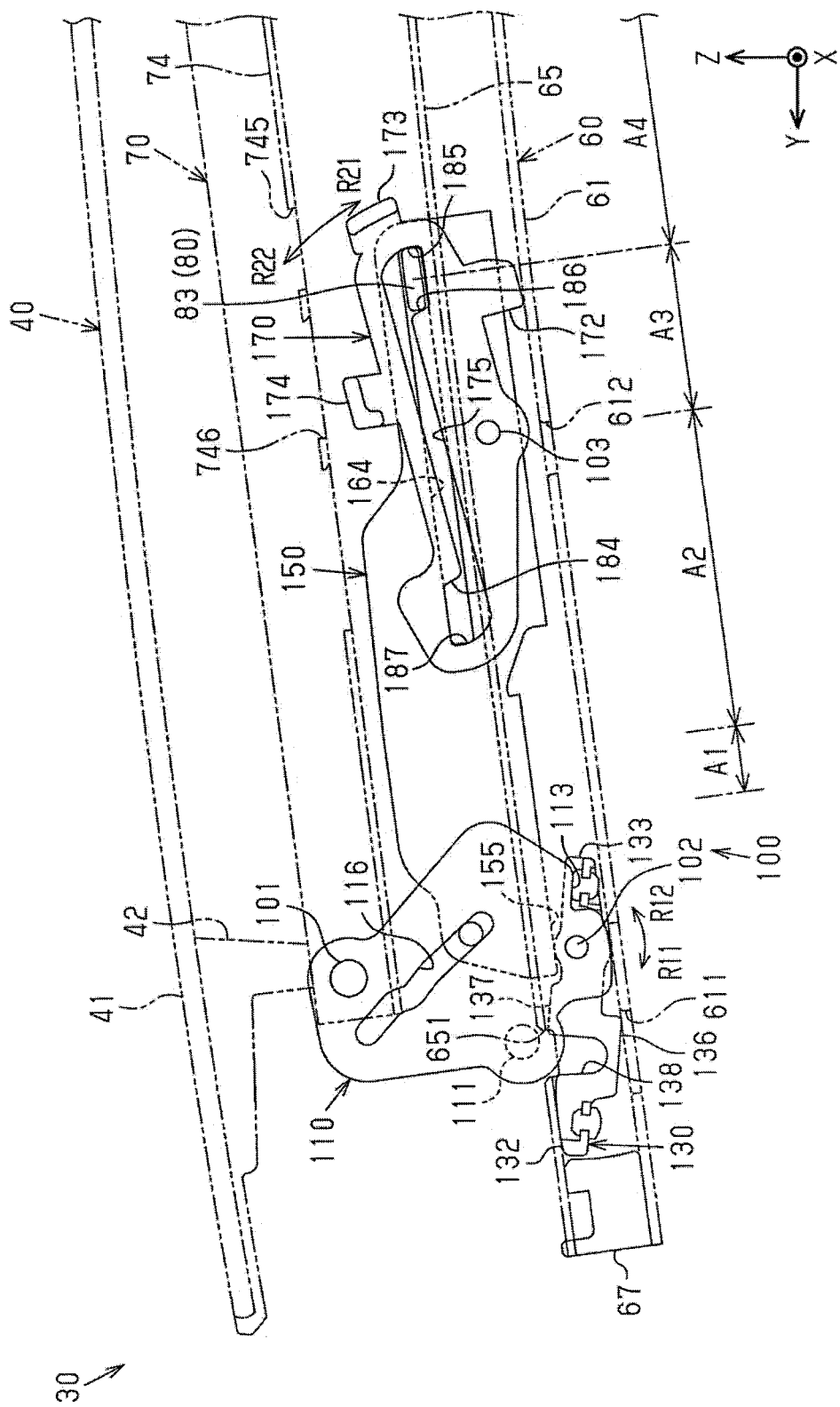
FIG. 28 is a partially enlarged view of FIG. 18, as well as, a side view of the front support mechanism when the drive shoe is positioned at the rear end of the third movement range.

As illustrated in FIG. 28, when the drive shoe 80 has moved up to the rear end of the third movement range A3, the front shoe 150 is arranged at a "fourth position" and the front link 110 is arranged in the "first front-up corresponding position (front-up corresponding position)." In addition, in a state where the rear link 220 is arranged in the standing position, when the front link 110 is arranged in the first front-up corresponding position, the movable panel 40 is arranged in the first front-up position.

When the front link 110 is arranged at the first front-up corresponding position, the first convex 136 of the front link check 130 disengages from the first recess 611 of the guide rail 60. Accordingly, the front link 110 is enabled to move rearward with the front link check 130.

Figure 29:
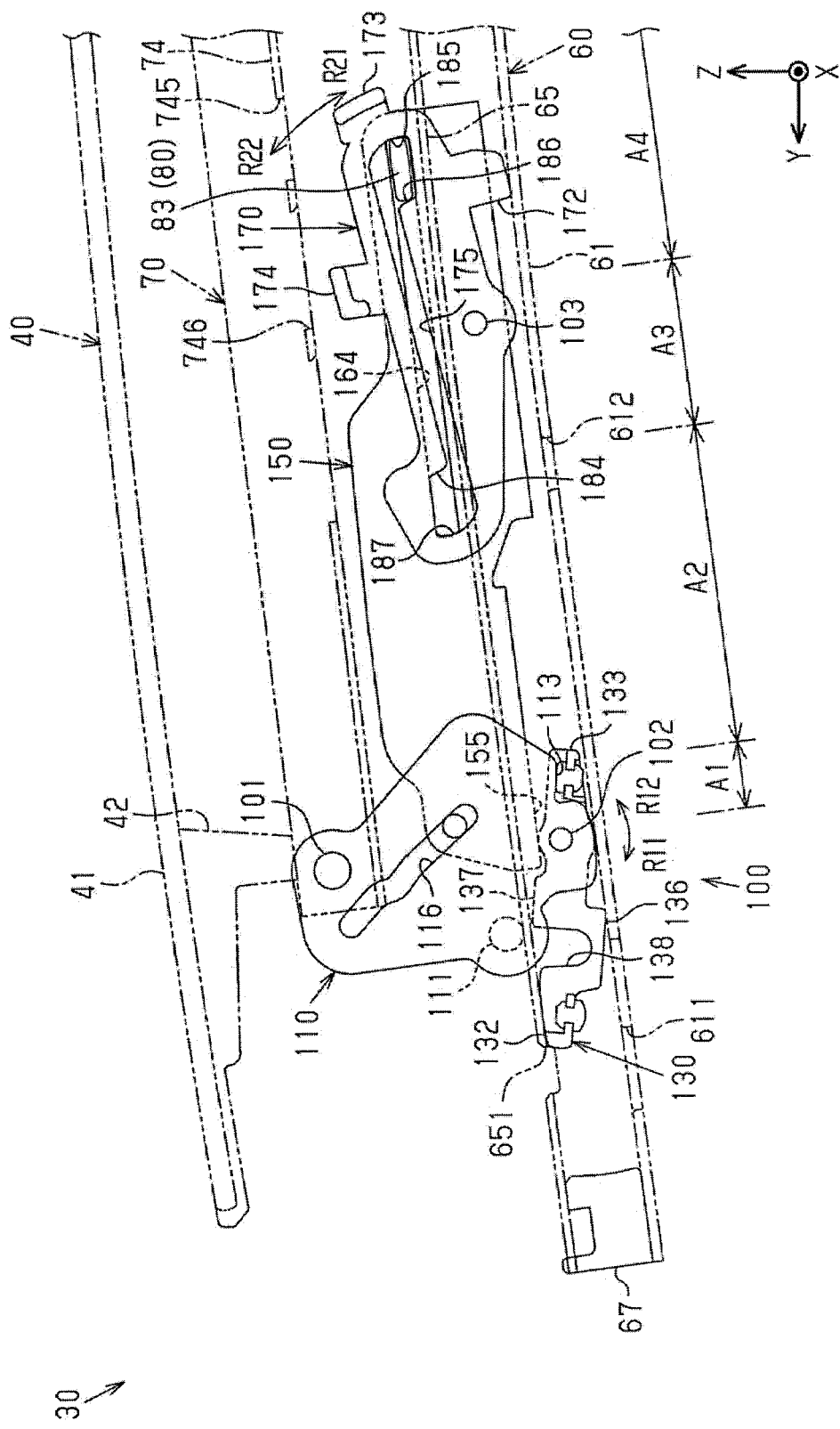
FIG. 29 is a side view of the front support mechanism when the drive shoe is positioned within a fourth movement range.

As illustrated in FIG. 29, when the drive shoe 80 moves rearward in the fourth movement range A4, the second guide shaft 83 of the drive shoe 80 presses the first release surface 185 of the second guide groove 175 of the front shoe check 170 in the rearward direction. In addition, the first guide shaft 153 of the front shoe 150 presses the proximal edge of the first guide groove 116 of the front link 110 in the rearward direction.

In this way, the front shoe check 170, the front shoe 150, the front link 110, and the front link check 130 move rearward with the drive shoe 80. As the result, the movable panel 40 performs the slide operation in the rearward direction. As illustrated in FIG. 19, when the drive shoe 80 has moved up to the rear end of the fourth movement range A4, the front shoe 150 is arranged at the "fifth position" and the front link 110 is arranged in the "full-open corresponding position." In addition, in a state where the rear link 220 is arranged in the standing position, when the front link 110 is arranged in the full-open corresponding position, the movable panel 40 is arranged in the full-open position.

Next, the following will describe the operation of the front support mechanism 100 when the drive shoe 80 moves forward in the fourth movement range A4 and the third movement range A3 to cause the movable panel 40 to perform a close operation.

As illustrated in FIG. 29, when the drive shoe 80 moves forward in the fourth movement range A4, the second guide shaft 83 of the drive shoe 80 presses the second working surface 186 of the second guide groove 175 of the front shoe check 170 in the forward direction. In addition, the first guide shaft 153 of the front shoe 150 presses the proximal edge of the first guide groove 116 of the front link 110 in the forward direction.

In this way, the front shoe 150, the front shoe check 170, the front link 110, and the front link check 130 move forward with the drive shoe 80. In particular, the front shoe 150 moves forward from the fifth position, the front link 110 moves forward from the full-close corresponding position, and the movable panel 40 performs the slide operation in the forward direction from the full-close corresponding position.

In addition, the second working surface 186 being pressed by the second guide shaft 83 of the drive shoe 80 is inclined in a direction apart from the bottom wall 61 of the guide rail 60 as the second working surface 186 advances in the direction of the movement of the drive shoe 80. As such, when the drive shoe 80 moves forward in the fourth movement range A4 and the third movement range A3, a moment of the first rotation direction R21 applies to the front shoe check 170.

As illustrated in FIG. 28, when the drive shoe 80 moves up to the front end of the fourth movement range A4, the front shoe 150 is arranged at the fourth position and the front link 110 is arranged in the first front-up corresponding position. In addition, in a state where the rear link 220 is arranged in the standing position, when the front link 110 is arranged in the first front-up corresponding position, the movable panel 40 is arranged in the first front-up position.

When the front link 110 is arranged in the first front-up corresponding position, the front end of the front lever 132 of the front link check 130 becomes in contact with the stopper block 67, restricting the forward movement of the front link 110 and the front link check 130. In addition, the first convex 136 of the front link check 130 faces the first recess 611 of the guide rail 60.

As illustrated in FIG. 27, when the drive shoe 80 has moved slightly forward from the rear end of the third movement range A3, the front shoe 150 is arranged at the third position and the front link 110 is arranged in the check switching position. When the front shoe 150 is arranged at the third position, the second plate 155 of the front shoe 150 starts sliding with the front lever 132 of the front shoe 150. As such, the front link check 130 rotates in the second rotation direction R12, and the first convex 136 of the front link check 130 engages with the first recess 611 of the guide rail 60. That prevents the front link 110 and the front link check 130 from moving in the front-rear direction along the guide rail 60. Thus, when the front shoe 150 moves forward from the third position, the front link 110 rotates in the second rotation direction R12 without moving forward. The second rotation direction R12 is a direction that causes the front link 110 to collapse in the forward direction.

As illustrated in FIG. 24, when the drive shoe 80 moves near the front end of the third movement range A3, the front shoe 150 is arranged at the second position and the front link 110 is arranged in the second front-up corresponding position. In a state illustrated in FIG. 24, although the front link 110 is arranged in the second front-up corresponding position, since the rear link 220 is arranged in the standing position, the movable panel 40 is arranged in the rear-up position.

As illustrated in FIG. 24, when the front shoe 150 is arranged at the second position, the second engagement 174 of the front shoe check 170 becomes in contact with the second contact part 746 of the guide rail 60, which prevents the front shoe check 170 from moving forward. Whereas, since the second convex 172 of the front shoe check 170 faces the second recess 612 of the guide rail 60, the front shoe check 170 to which the moment of the first rotation direction R21 applies rotates in the first rotation direction R21.

Further, as illustrated in FIGS. 27 and 24, when the front link 110 rotates from the check switching position to the second front-up corresponding position, the first holding shaft 111 of the front link 110 moves inside the guide rail 60 through the first cutouts 651 of the guide rail 60.

As illustrated in FIG. 23, when the drive shoe 80 moves forward from the rear end of the second movement range A2, the front shoe check 170 ends rotating in the first rotation direction R21, and the second convex 172 of the front shoe check 170 engages with the second recess 612 of the guide rail 60. Then, in a side view from the width direction, the second guide groove 175 of the front shoe check 170 overlaps the linear groove 164 of the front shoe 150.

As such, as illustrated in FIGS. 23 and 22, when the drive shoe 80 moves forward in the second movement range A2, the power of the drive shoe 80 cannot be transmitted to the front shoe check 170 and the front shoe 150. Thus, when the drive shoe 80 moves forward in the second movement range A2, the front shoe 150 remains to be arranged at the second position, and the front link 110 remains to be arranged at the second front-up corresponding position.

As illustrated in FIG. 22, when the drive shoe 80 has moved to near the front end of the second movement range A2, the second guide shaft 83 of the drive shoe 80 becomes in contact with the second release surface 187 of the second guide groove 175 of the front shoe check 170. The second release surface 187 is inclined in a direction apart from the bottom wall 61 of the guide rail 60 as the second release surface 187 advances in the direction of the movement of the drive shoe 80. As such, when the drive shoe 80 moves forward near the front end of the second movement range A2, the moment of the second rotation direction R22 applies to the front shoe check 170, and the front shoe check 170 rotates in the second rotation direction R22.

As illustrated in FIG. 21, when the drive shoe 80 moves forward from the rear end of the first movement range A1, the front shoe check 170 ends rotating in the second rotation direction R22, and the second convex 172 of the front shoe check 170 disengages from the second recess 612 of the guide rail 60. Accordingly, the power of the drive shoe 80 can be transmitted to the front shoe 150, which allows the front shoe 150 and the front shoe check 170 to move forward.

Next, the following will describe the operation of the rear support mechanism 200 when the drive shoe 80 moves forward in the second movement range A2 to cause the movable panel 40 to perform the close operation.

As illustrated in FIG. 26, when the drive shoe 80 is positioned at the rear end of the second movement range A2, the rear link 220 is arranged in the standing position, and the movable panel 40 is arranged in the rear tilt-up position.

As illustrated in FIGS. 17 and 16, when the drive shoe 80 moves forward from the rear end of the second movement range A2, the fifth guide shaft 252 of the rear shoe check 250 moves from the third recess 641 of the guide rail 60 to the third guide groove 85 of the drive shoe 80. Accordingly, the drive shoe 80 and the rear shoe check 250 engage with each other, which allows the power of the drive shoe 80 to be transmitted to the rear shoe check 250. As such, when the drive shoe 80 moves forward in the second movement range A2 and the first movement range A1, the rear shoe 240 retains a state where the fifth guide shaft 252 is engaged with the third guide groove 85 of the drive shoe 80.

As illustrated in FIG. 26, when the drive shoe 80 moves forward from the rear end of the second movement range A2, the drive shoe 80 pulls the rear shoe 240 in the forward direction through the link cable 203. Then, the third guide shaft 243 of the rear shoe 240 slides with the third guide surface 225 of the rear link 220. Accordingly, as the rear shoe 240 moves forward, the rear link 220 rotates in the second rotation direction R32.

As illustrated in FIG. 25, when the drive shoe 80 has moved up to the front end of the second movement range A2, the rear link 220 is arranged in the collapsed position. Accordingly, in a state where the front link 110 is arranged in the second front-up position, when the rear link 220 is arranged in the collapsed position, the movable panel 40 is arranged in the second front-up position.

Finally, the following will describe the operation of the front support mechanism 100 when the drive shoe 80 moves forward in the first movement range A1 to cause the movable panel 40 to perform the close operation.

As illustrated in FIG. 21, when the drive shoe 80 moves forward in the first movement range A1, the third guide shaft 243 of the drive shoe 80 presses the second release surface 187 of the second guide groove 175 of the front shoe check 170 in the forward direction. Then, the power that the second guide shaft 83 of the drive shoe 80 presses the front shoe check 170 in the forward direction is transmitted to the front shoe 150 through the check support shaft 103, and the front shoe 150 moves forward. In other words, when the drive shoe 80 moves forward in the first movement range A1, the front shoe 150 starts moving in the forward direction again and the front link 110 starts rotating in the second rotation direction R12 again.

As illustrated in FIG. 20, when the drive shoe 80 is positioned at the front end of the first movement range A1, the front shoe 150 is arranged at the first position. In addition, in a state where the rear link 220 is arranged in the collapsed position, when the front link 110 is arranged in the full-close corresponding position, the movable panel 40 is arranged in the full-close position.

The effects of this embodiment will be described.

(1) The front link 110 intersects with a line segment of the first guide groove 116 connecting the front connection shaft 101 and the front support shaft 102 in a side view from the width direction. As such, when the first guide groove 153 of the front shoe 150 slides with the first guide groove 116 of the front link 110, the first guide shaft 153 is likely to be positioned between the front connection shaft 101 and the front support shaft 102. In particular, as illustrated in—FIGS. 20 to 24, and 26 to 28, the first guide shaft 153 is positioned between the front connection shaft 101 and the front support shaft 102 in at least one direction of the front-rear direction and up-down direction.

Thus, the sunroof apparatus 30 does not take an arrangement relationship where the front support shaft 102 is positioned between the front connection shaft 101 and the first guide shaft 153 in both front-rear direction and up-down direction. The sunroof apparatus 30 can, therefore, suppress the effect of a large bending moment on the front link 110, for example, even when a load in the up-down direction is applied to the movable panel 40. As the result, the sunroof apparatus 30 can suppress enlargement of the front link 110.

(2) As illustrated in FIGS. 20 to 24, 27, and 28, the sunroof apparatus 30 includes a front link check 130 that restricts the front link 110 from moving in the front-rear direction when the front link 110 is arranged at a position between the full-close corresponding position and the first front-up corresponding position. Accordingly, the sunroof apparatus 30 can move the front link 110 a lot more in the front-rear direction when the movable panel 40 performs the slide operation, while the sunroof apparatus 30 cannot move the front link 110 in the front-rear direction when the movable panel 40 performs the first-tilt operation or the second-tilt operation. The sunroof apparatus 30, therefore, allows the movable panel 40 to move by a large amount in the front-rear direction when the movable panel 40 performs the slide operation. As the result, the sunroof apparatus 30 can increase the open rate of the opening 21 when the movable panel 40 is arranged in the full-open position.

(3) As illustrated in FIGS. 20 to 24, and 27, when the front link 110 is arranged between the full-close position and the first front-up corresponding position, the front link check 130 restricts the front-rear direction movement of the front link 110 by making the first convex 136 engaged with the first recess 611 of the guide rail 60. On the other hand, as illustrated in FIGS. 28 and 29, when the front link 110 is arranged between the first front-up corresponding position and the full-open corresponding position, the front link check 130 allows the front-rear direction movement of the front link 110 by making the first convex 136 disengaged from the first recess 611 of the guide rail 60. In this way, the sunroof apparatus 30 can restrict or allow the front-rear direction movement of the front link 110 by switching the engagement state of the front link check 130 and the guide rail 60.

(4) In the sunroof apparatus 30, under a state where the movable panel 40 is performing the open operation, when the front link 110 has rotated to the check switching position as illustrated in FIG. 27, the pressing surface 113 of the front link 110 starts pressing the rear lever 133 of the front link check 130. Accordingly, with regard to the front link check 130, while the rear lever 133 approaches the wall of the guide rail 60, the front lever 132 separates away from the bottom wall 61 of the guide rail 60. Then, as illustrated in FIG. 28, when the front link 110 has rotated to the second front-up corresponding position, the sunroof apparatus 30 prevents the first convex 136 of the front link check 130 from engaging with the first recess 611 of the guide rail 60. In this way, the sunroof apparatus 30 can switch the operation state of the front link check 130 at appropriate timing using the rotatable front link 110.

Further, as illustrated in FIG. 28, under a state where the movable panel 40 is performing the open operation, the front link 110 presses, with the pressing surface 113, the rear lever 133 of the front link check 130 even after the front link 110 has rotated to the second front-up corresponding position. As such, when the front link 110 moves between the second front-up corresponding position and the full-close corresponding position, the first convex 136 of the front link check 130 can be prevented from sliding with the bottom wall 61 of the guide rail 60.

(5) As illustrated in FIGS. 21 to 24 and 27, in the sunroof apparatus 30, when the front link 110 rotates between the full-close position and the check switching position, the front shoe 150 that moves along the guide rail 60 slides with the sliding surface 137 of the front lever 132 of the front link check 130. In other words, when the front link 110 rotates between the full-close position and the check switching position, the front link check 130 is prevented from rotating in a way that the front lever 132 separates away from the bottom wall 61 of the guide rail 60. Accordingly, when the front link 110 rotates between the full-close position and the check switching position, the first convex 136 of the front link check 130 remains to be engaged with the first recess 611 of the guide rail 60. Thus, the sunroof apparatus 30 can prevent switching of the operation state of the front link check 130 at inappropriate timing without adding any new components.

(6) As illustrated in FIGS. 18 and 19, when the movable panel 40 performs the slide operation, the first holding shaft 111 of the front link 110 engages with the guide rail 60 from above at a more forward position than the front support shaft 102. Under a state where the movable panel 40 can perform the slide operation, if a head-on collision, etc. of the vehicle 10 occurs, an impact that moves the movable panel 40 in the forward direction applies to the sunroof apparatus 30. In the sunroof apparatus 30 of this embodiment, when such an impact applies to the movable panel 40, the front link 110 that supports the movable panel 40 is caused to rotate around the axis line of the front support shaft 102. Then, the front link 110 is caused to move in the forward direction while pressing the first holding shaft 111 against the guide rail 60. Thus, friction force is generated between the first holding shaft 111 of the front link 110 and the guide rail 60, which makes the front link 110 hard to move in the forward direction. As the result, the sunroof apparatus 30 can prevent the movable panel 40 from moving abruptly in the forward direction, for example, upon a head-on collision, etc.

(7) As illustrated in FIGS. 18 and 19, when the movable panel 40 performs the slide operation, the second holding shaft 112 of the front link 110 engages with the front sliding part 152 of the front shoe 150 from above at a more rearward position than the front support shaft 102. As such, when the movable panel 40 performs the slide operation, the front link 110 is prevented from rotating around the front support shaft 102. The sunroof apparatus 30, therefore, can stabilize the posture of the front edge of the movable panel 40 when the movable panel 40 performs the slide operation.

(8) The sunroof apparatus 30 indirectly transmits the power of the drive shoe 80 to the front link 110 through the front shoe 150 and the front shoe check 170. In this way, as illustrated in FIGS. 22 and 23, when the rear link 220 shifts between the collapsed position and the standing position to raise or lower the rear edge of the movable panel 40, even if a load is applied to the movable panel 40, the load is unlikely to be transmitted to the drive shoe 80 through the front link 110. In particular, since the drive shoe 80 engages with the guide rail 60 through the front sliding part 152, even if a load applies to the movable panel 40, which then applies up-down direction power to the first guide shaft 153 of the front shoe 150, sliding friction between the second guide shaft 83 of the drive shoe 80 and the second guide groove 175 of the front shoe check 170 does not increase. The sunroof apparatus 30, therefore, can reduce the load that applies to the drive shoe 80 when the movable panel 40 performs the rear tilt operation.

(9) In the sunroof apparatus 30, when the movable panel 40 performs the open operation, the drive shoe 80 moves rearward sequentially through the first movement range A1, the second movement range A2, the third movement range A3, and the fourth movement range A4. As illustrated in FIGS. 20 and 21, when the drive shoe 80 moves in the first movement range A1, the movable panel 40 performs the second front-up operation where the front edge moves upward in relation to the rear edge. Next, when the drive shoe 80 moves in the second movement range A2, the movable panel 40 performs the rear-up operation where the rear edge moves upward in relation to the front edge. As such, with the sunroof apparatus 30, compared with a case where the movable panel 40 does not perform the first front-up operation, the front edge of the movable panel 40 does not shift excessively downward when the movable panel 40 performs the rear-up operation. As the result, as illustrated in FIGS. 22 and 23, when the movable panel 40 performs the rear-up operation, the sunroof apparatus 30 can prevent the front edge of the movable panel 40 from excessively compressing the weather strip 25.

Then, the sunroof apparatus 30 can realize the above-described operation of the movable panel 40 by the front shoe check 170 that allows the drive shoe 80 to transmit power to the front shoe 150 when the drive shoe 80 is positioned in the first movement range A1, the third movement range A3, or the fourth movement range A4 and restricts the drive shoe 80 from transmitting power to the front shoe 150 when the drive shoe 80 is positioned in the second movement range A2.

(10) As illustrated in FIGS. 22 and 23, when the drive shoe 80 is positioned in the second movement range A2, since the front shoe check 170 takes a posture in which the second guide groove 175 extends in the movement direction of the drive shoe 80, the drive shoe 80 does not transmit power to the front shoe check 170 even if the drive shoe 80 moves within the second movement range A2. The sunroof apparatus 30, therefore, can switch the power transmission state of the drive shoe 80 to the front shoe 150 by changing the inclination of the second guide groove 175 formed in the front shoe check 170.

(11) As illustrated in FIGS. 22 and 23, when the drive shoe 80 is positioned in the second movement range A2, the front shoe check 170 takes a posture in which the second guide groove 175 extends in the movement direction of the drive shoe 80 when the second convex 172 of the front shoe check 170 engages with the second recess 612 of the guide rail 60. The sunroof apparatus 30, therefore, can change the inclination of the second guide groove 175 formed in the front shoe check 170 depending on the engagement state between the second convex 172 of the front shoe check 170 and the second recess 612 of the guide rail 60.

(12) In the front edge of the second guide groove 175 of the front shoe check 170, is formed a first working surface 184 that generates a moment for rotating the front shoe check 170 in the first rotation direction R21 when the first working surface 184 is pressed by the second guide shaft 83 of the drive shoe 80 that moves rearward in the first movement range A1. In the rear edge of the second guide groove 175 of the front shoe check 170, is formed a first release surface 185 that generates a moment for rotating the front shoe check 170 in the second rotation direction R22 when the first release surface 185 is pressed by the second guide shaft 83 of the drive shoe 80 that moves rearward in the third movement range A3.

As such, as illustrated in FIGS. 21 and 22, at timing when the drive shoe 80 ends moving rearward in the first movement range A1, that is, when the movable panel 40 starts performing the rear-up operation, the second convex 172 of the front shoe check 170 can engage with the second recess 612 of the guide rail 60. Further, as illustrated in FIGS. 23 and 24, at timing when the drive shoe 80 starts moving rearward in the third movement range A3, that is, when the movable panel 40 ends performing the rear-up operation, the second convex 172 of the front shoe check 170 disengages from the second recess 612 of the guide rail 60. Thus, when the movable panel 40 performs the open operation, the sunroof apparatus 30 allows the front shoe check 170 to function at appropriate timing in conjunction with the drive shoe 80 that moves rearward.

(13) As illustrated in FIG. 21, in the sunroof apparatus 30, when the movable panel 40 performs the open operation, at timing when the drive shoe 80 is positioned near the rear end of the first movement range A1, the first engagement 173 of the front shoe check 170 becomes in contact with the first contact part 745 of the panel bracket 70, which restricts the rearward movement of the front shoe check 170. As such, the front shoe check 170 rotates in such a way that the moment that applies to the front shoe check 170 causes the second convex 172 of the front shoe check 170 to engage with the second recess 612 of the guide rail 60. In other words, the front shoe check 170 is prevented from moving rearward even without the engagement between the second convex 172 of the front shoe check 170 and the second recess 612 of the guide rail 60. The sunroof apparatus 30, therefore, allows the front shoe check 170 to function more accurately when the movable panel 40 performs the open operation.

(14) In the rear edge of the second guide groove 175 of the front shoe check 170, is formed a second working surface 186 that generates a moment for rotating the front shoe check 170 in the first rotation direction R21 when the second working surface 186 is pressed by the second guide shaft 83 of the drive shoe 80 that moves forward in the third movement range A3. Whereas, in the front edge of the second guide groove 175 of the front shoe check 170, is formed a second release surface 187 that generates a moment for rotating the front shoe check 170 in the second rotation direction R22 when the second release surface 187 is pressed by the second guide shaft 83 of the drive shoe 80 that moves forward in the first movement range A1.

As such, as illustrated in FIGS. 24 and 23, at timing when the drive shoe 80 ends moving forward in the third movement range A3, that is, when the movable panel 40 starts performing the rear-down operation, the second convex 172 of the front shoe check 170 can engage with the second recess 612 of the guide rail 60. Further, as illustrated in FIGS. 22 and 21, at timing when the drive shoe 80 starts moving in the first movement range A1, that is, when the movable panel 40 ends performing the rear-down operation, the second convex 172 of the front shoe check 170 disengages from the second recess 612 of the guide rail 60. Thus, when the movable panel 40 performs the close operation, the sunroof apparatus 30 allows the front shoe check 170 to function at appropriate timing in conjunction with the drive shoe 80 that moves forward.

(15) As illustrated in FIG. 24, with the sunroof apparatus 30, when the movable panel 40 performs the close operation, at timing when the drive shoe 80 is positioned near the front end of the third movement range A3, the second engagement 174 of the front shoe check 170 becomes in contact with the second contact part 746 of the panel bracket 70, which restricts the forward movement of the front shoe check 170. As such, the front shoe check 170 rotates in such a way that the moment that applies to the front shoe check 170 causes the second convex 172 of the front shoe check 170 to engage with the second recess 612 of the guide rail 60. In other words, the front shoe check 170 is prevented from moving forward even without the engagement between the second convex 172 of the front shoe check 170 and the second recess 612 of the guide rail 60. The sunroof apparatus 30, therefore, allows the front shoe check 170 to function more accurately when the movable panel 40 performs the close operation.

This embodiment can also be implemented with the following modifications. This embodiment and the following modification examples can be used in combination as long as they do not technically conflict with each other. The sunroof apparatus 30 does not have to be configured in such a way that one link of the front link 110 and the rear link 220 necessarily operates when the drive shoe 80 moves along the guide rail 60. For example, the sunroof apparatus 30 may provide a movement range of the drive shoe 80 where both front link 110 and rear link 220 operate or provide a movement range of the drive shoe 80 where neither front link 110 nor rear link 220 operates.

The panel bracket 70 may not have the first contact part 745 or the second contact part 746. Even in such a case, when the movable panel 40 starts performing the rear-up operation or rear-down operation, a sufficiently large moment that applies to the front link check 130 can cause the front link check 130 to normally function.

The front link 110 may not have the first holding shaft 111 or the second holding shaft 112. In such a case, the front link 110 preferably has a part that slides with the guide rail 60 when the front link 110 shifts between the first front-up corresponding position and the full-open corresponding position.

The front link check 130 may not have the first widening part 182 and the second widening part 183 in the second guide groove 175. In other words, the front link check 130 may not have the first working surface 184, first release surface 185, second working surface 186, or second release surface 187 in the second guide groove 175. Even in such a case, when the drive shoe 80 moves in the second movement range A2, since the second guide groove 175 of the front shoe check 170 extends in the movement direction of the drive shoe 80, the power of the drive shoe 80 does not transmit to the front shoe check 170. On the other hand, when the drive shoe 80 is positioned in the first movement range A1, third movement range A3, or fourth movement range A4, since the second guide groove 175 of the front shoe check 170 extends in a direction intersecting with the movement direction of the drive shoe 80, the power of the drive shoe 80 transmits to the front shoe 150 through the front shoe check 170. In this way, even this configuration can switch the power transmission state of the drive shoe 80 to the front shoe 150.

The front link check 130 may not have the rear lever 133. In such a case, the front support mechanism 100 preferably has an energizing member for providing the moment of the first rotation direction R11 to the front link check 130. According to this, when the movable panel 40 performs the open operation, at timing when the front link check 130 no longer slides with the front shoe 150, the front link check 130 can rotate in the first rotation direction R11. The energizing member may be configured, for example, by a torsion coil spring, a spiral spring, or the like.

The front link check 130 may not have the sliding surface 137. In such a case, the front support mechanism 100 preferably has an energizing member for providing the moment of the second rotation direction R12 to the front link check 130. According to this, when the movable panel 40 performs the open operation, the front link check 130 can be prevented from rotating in the first rotation direction R11 until the rear lever 133 of the front link check 130 is pressed by the front link 110. The energizing member may be configured, for example, by a torsion coil spring, a spiral spring, or the like.

The first recess 611 with which the first convex 136 of the front link check 130 engages may be provided on a different wall than the bottom wall 61 of the guide rail 60. Likewise, the second recess 612 with which the second convex 172 of the front shoe check 170 engages may be provided on a different wall than the bottom wall 61 of the guide rail 60.

A sunroof apparatus that solves the above-described problem includes a movable panel, a panel bracket, a guide rail, a drive shoe, and a front support mechanism and a rear support mechanism. The movable panel opens/closes an opening formed in a roof of a vehicle. The panel bracket supports the movable panel. The guide rail extends in a front-rear direction of the vehicle. The drive shoe moves along the guide rail. The front support mechanism and the rear support mechanism support the panel bracket. The front support mechanism includes a front link that supports a front edge of the panel bracket and has a first guide groove, a front connection shaft that connects the panel bracket and the front link in a relatively rotatable manner around an axial line extending in a width direction of the vehicle, a front support shaft that supports the front link in a rotatable manner around an axial line extending in the width direction of the vehicle, and a front shoe that is configured to include a first guide shaft to be inserted in the width direction of the vehicle through the first guide groove and move along the guide rail. The rear support mechanism includes a rear link that supports the panel bracket at a rearward position of the vehicle from the front link. The movable panel performs a first tilt operation between a full-close position where the movable panel fully closes the opening and a rear-up position where a rear edge of the movable panel is raised higher than the full-close position, a second tilt operation between the rear-up position and a front-up position where a front edge of the movable panel is raised higher than the rear-up position, and a slide operation between the front-up position and a full-open position where the movable panel is moved in a rearward direction of the vehicle than the front-up position. The front link shifts, based on power to be transmitted from the first guide shaft of the front shoe, among a full-close corresponding position that allows the movable panel to be arranged in the full-close position, a front-up corresponding position that allows the movable panel to be arranged in the front-up position, and a full-open corresponding position that allows the movable panel to be arranged in the full-open position. The rear link shifts, based on power to be transmitted from the drive shoe, between a collapsed position that allows the movable panel to be arranged in the full-close position and a standing position that allows the movable panel to be arranged in the rear-up position. The first guide groove extends so as to intersect with a line segment connecting the front connection shaft and the front support shaft, in a side view of the front link from the width direction of the vehicle.

According to the above-described configuration, the first guide groove of the front link intersects with the line segment connecting the front connection shaft and the front support shaft in a side view from the width direction of the vehicle. As such, when the first guide shaft of the drive shoe slides with the first guide groove of the front link, the first guide shaft is likely to be positioned between the front connection shaft and the front support shaft. In other words, the sunroof apparatus is unlikely to take a position relation where the front support shaft is positioned between the front connection shaft and the first guide shaft in the up-down direction and front-rear direction of the vehicle. In this way, with the sunroof apparatus, a large bending moment hardly applies to the front link when a load in the upward direction of the vehicle applies to the movable panel, which enables suppressing enlargement of the front link.

In the above-described sunroof apparatus, the front link may rotate between the full-close corresponding position and the front-up corresponding position when the first guide shaft slides with the first guide groove, and may move along the guide rail between the front-up corresponding position and the full-open corresponding position when the first guide shaft presses an end of the first guide groove, and the front support mechanism may include a front link check that restricts movement of the front link along the guide rail when the front link is positioned between the full-close corresponding position and the front-up corresponding position.

The sunroof apparatus of the above-described configuration prevents the front link from moving in the front-rear direction of the vehicle when the front link is positioned between the full-close corresponding position and the front-up corresponding position, that is, when the movable panel performs the first tilt operation or the second tilt operation. In this way, when the movable panel performs the slide operation, the sunroof apparatus allows the front link to move by a large amount in the front-rear direction of the vehicle. Accordingly, when the movable panel performs the slide operation, the sunroof apparatus allows the movable panel to move by a large amount in the front-rear direction of the vehicle.

In the above-described sunroof apparatus, the guide rail may include a wall in which a first recess is formed, the front link check may be configured to include a connection part to be connected to the front link in a relatively rotatable manner by the front support shaft, and a front lever that extends in a forward position of the vehicle from the connection part and includes a first convex that can engage with the first recess, in a state where the front link is positioned between the full-close corresponding position and the front-up corresponding position, movement of the front link along the guide rail may be restricted when the first convex engages with the first recess, and, in a state where the front link is positioned between the front-up corresponding position and the full-open corresponding position, movement of the front link along the guide rail may be allowed when the first convex disengages from the first recess.

According to the above-described configuration, when the movable panel performs the first tilt operation or the second tilt operation, the front link check prevents the front link from moving in the front-rear direction of the vehicle by engaging the first convex with the first recess. On the other hand, when the movable panel performs the slide operation, the front link check allows the front link to move in the front-rear direction of the vehicle by disengaging the first convex from the first recess. In this way, the sunroof apparatus can restrict or allow movement of the front link in the front-rear direction of the vehicle by switching the engagement state between the front link check and the guide rail.

In the above-described sunroof apparatus, the front link check may be configured to include a rear lever extending in a rearward direction of the vehicle from the connection part, and, when a position that is between the full-close corresponding position and the front-up corresponding position and that is closer to the front-up corresponding position than the full-close corresponding position is defined as a check switching position, in a state where the front link is positioned between the check switching position and the full-open corresponding position, the front link may include a pressing surface that presses the rear lever of the front link check against the wall.

In the sunroof apparatus of the above-described configuration, in a state where the movable panel performs the open operation, when the front link rotates to the check switching position, the pressing surface of the front link starts pressing the rear lever of the front link check. Accordingly, with regard to the front link check, the rear lever approaches the wall of the guide rail and the front lever separates away from the wall of the guide rail. Then, when the front link rotates to the front-up corresponding position, the sunroof apparatus prevents the first convex of the front link check from engaging with the first recess of the guide rail. In this way, the sunroof apparatus can switch the operation state of the front link check at appropriate timing without adding any new components.

In the above-described sunroof apparatus, the front lever may include a sliding surface extending along the guide rail in a state where the first convex is engaged with the first recess, and, when the front link is positioned between the full-close corresponding position and the check switching position, the front shoe may slide with the sliding surface of the front lever of the front link check.

In the sunroof apparatus of the above-described configuration, when the front link rotates between the full-close corresponding position and the check switching position, the front shoe that moves along the guide rail slides with the sliding surface of the front lever of the front link check. In other words, when the front link rotates between the full-close corresponding position and the check switching position, the front link check is prevented from rotating in such a way that the front lever separates away from the wall of the guide rail. In particular, when the front link rotates between the full-close corresponding position and the check switching position, the engagement state between the first convex of the front link check and the first recess of the guide rail is maintained. Thus, the sunroof apparatus can prevent the front link check from switching the operation state at inappropriate timing without adding any new components.

In the above-described sunroof apparatus, the front link may be configured to include a first holding shaft that, when the front link is positioned between the front-up corresponding position and the full-open corresponding position, can engage with the guide rail from above at a forward position of the vehicle from the front support shaft.

Under a state where the movable panel can perform the slide operation, when a head-on collision, etc. of the vehicle occurs, an impact that moves the movable panel in the forward direction of the vehicle applies to the sunroof apparatus. Then, in the sunroof apparatus of the above-described configuration, when the above-described impact applies to the movable panel, the front link that supports the movable panel is caused to rotate around the axis line of the front support shaft. As such, the front link is caused to move in the forward direction of the vehicle while pressing the first holding shaft against the guide rail. Thus, friction force is generated between the first holding shaft of the front link and the guide rail, which makes the front link hard to move in the forward direction of the vehicle. In this way, the sunroof apparatus can prevent the movable panel from moving suddenly in the forward direction of the vehicle, upon a head-on collision, etc. of the vehicle.

In the above-described sunroof apparatus, the front link may be configured to include a second holding shaft that, when the front link is positioned between the front-up corresponding position and the full-open corresponding position, can engage with the front shoe from above at a rearward position of the vehicle from the front support shaft.

In the sunroof apparatus of the above-described configuration, when the movable panel performs the slide operation, the second holding shaft of the front link engages with the front shoe from vertically above. As such, when the movable panel performs the slide operation, the front link is prevented from rotating around the front support shaft. The sunroof apparatus, therefore, can stabilize the posture of the front edge of the movable panel that performs the slide operation.

The principles, preferred embodiment and mode of operation of the present invention have been described in the foregoing specification. However, the invention which is intended to be protected is not to be construed as limited to, the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A sunroof apparatus comprising:
a movable panel that opens/closes an opening formed in a roof of a vehicle;
a panel bracket that supports the movable panel;
a guide rail that extends in a front-rear direction of the vehicle;
a drive shoe that moves along the guide rail; and
a front support mechanism and a rear support mechanism that support the panel bracket, wherein
the front support mechanism includes:
   a front link that supports a front edge of the panel bracket and has a first guide groove;
   a front connection shaft that connects the panel bracket and the front link in a relatively rotatable manner around an axial line extending in a width direction of the vehicle;
   a front support shaft that supports the front link in a rotatable manner around an axial line extending in the width direction of the vehicle; and
   a front shoe that is configured to include a first guide shaft to be inserted in the width direction of the vehicle through the first guide groove, and moves along the guide rail,
the rear support mechanism includes a rear link that supports the panel bracket at a rearward position of the vehicle from the front link,
the movable panel performs:
   a first tilt operation between a full-close position where the movable panel fully closes the opening and a rear-up position where a rear edge of the movable panel is raised higher than the full-close position;
   a second tilt operation between the rear-up position and a front-up position where a front edge of the movable panel is raised higher than the rear-up position; and
   a slide operation between the front-up position and a full-open position where the movable panel is moved rearward from the front-up position, the front link shifts, based on power to be transmitted from the first guide shaft of the front shoe, among a full-close corresponding position that allows the movable panel to be arranged in the full-close position, a front-up corresponding position that allows the movable panel to be arranged in the front-up position, and a full-open corresponding position that allows the movable panel to be arranged in the full-open position,
the rear link shifts, based on power to be transmitted from the drive shoe, between a collapsed position that allows the movable panel to be arranged in the full-close position and a standing position that allows the movable panel to be arranged in the rear-up position, and
the first guide groove extends so as to intersect with a line segment connecting the front connection shaft and the front support shaft, in a side view of the front link from the width direction of the vehicle.

2. The sunroof apparatus according to claim 1, wherein the front link rotates between the full-close corresponding position and the front-up corresponding position when the first guide shaft slides with the first guide groove, and moves along the guide rail between the front-up corresponding position and the full-open corresponding position when the first guide shaft presses an end of the first guide groove, and
the front support mechanism includes a front link check that restricts movement of the front link along the guide rail when the front link is positioned between the full-close corresponding position and the front-up corresponding position.

3. The sunroof apparatus according to claim 2, wherein the guide rail includes a wall in which a first recess is formed,
the front link check is configured to include: a connection part to be connected to the front link in a relatively rotatable manner by the front support shaft; and a front lever that extends in a forward position of the vehicle from the connection part and includes a first convex that can engage with the first recess,
in a state where the front link is positioned between the full-close corresponding position and the front-up corresponding position, movement of the front link along the guide rail is restricted when the first convex engages with the first recess, and,
in a state where the front link is positioned between the front-up corresponding position and the full-open corresponding position, movement of the front link along the guide rail is allowed when the first convex disengages from the first recess.

4. The sunroof apparatus according to claim 3, wherein the front link check is configured to include a rear lever extending in a rearward direction of the vehicle from the connection part, and
the front link includes a pressing surface that, when a position that is between the full-close corresponding position and the front-up corresponding position and that is closer to the front-up corresponding position than the full-close corresponding position is defined as a check switching position, in a state where the front link is positioned between the check switching position and the full-open corresponding position, presses the rear lever of the front link check against the wall.

5. The sunroof apparatus according to claim 4, wherein the front lever includes a sliding surface extending along the guide rail in a state where the first convex is engaged with the first recess, and,
when the front link is positioned between the full-close corresponding position and the check switching position, the front shoe slides with the sliding surface of the front lever of the front link check.

6. The sunroof apparatus according to claim 1, wherein the front link is configured to include a first holding shaft that, when the front link is positioned between the front-up corresponding position and the full-open corresponding position, can engage with the guide rail from above at a forward position of the vehicle from the front support shaft.

7. The sunroof apparatus according to claim 2, wherein the front link is configured to include a first holding shaft that, when the front link is positioned between the front-up corresponding position and the full-open corresponding position, can engage with the guide rail from above at a forward position of the vehicle from the front support shaft.

8. The sunroof apparatus according to claim 3, wherein the front link is configured to include a first holding shaft that, when the front link is positioned between the front-up corresponding position and the full-open corresponding position, can engage with the guide rail from above at a forward position of the vehicle from the front support shaft.

9. The sunroof apparatus according to claim 4, wherein the front link is configured to include a first holding shaft that, when the front link is positioned between the front-up corresponding position and the full-open corresponding position, can engage with the guide rail from above at a forward position of the vehicle from the front support shaft.

10. The sunroof apparatus according to claim 5, wherein the front link is configured to include a first holding shaft that, when the front link is positioned between the front-up corresponding position and the full-open corresponding position, can engage with the guide rail from above at a forward position of the vehicle from the front support shaft.

11. The sunroof apparatus according to claim 1, wherein the front link is configured to include a second holding shaft that, when the front link is positioned between the front-up corresponding position and the full-open corresponding position, can engage with the front shoe from above at a rearward position of the vehicle from the front support shaft.

12. The sunroof apparatus according to claim 2, wherein the front link is configured to include a second holding shaft that, when the front link is positioned between the front-up corresponding position and the full-open corresponding position, can engage with the front shoe from above at a rearward position of the vehicle from the front support shaft.

13. The sunroof apparatus according to claim 3, wherein the front link is configured to include a second holding shaft that, when the front link is positioned between the front-up corresponding position and the full-open corresponding position, can engage with the front shoe from above at a rearward position of the vehicle from the front support shaft.

14. The sunroof apparatus according to claim 4, wherein the front link is configured to include a second holding shaft that, when the front link is positioned between the front-up corresponding position and the full-open corresponding position, can engage with the front shoe from above at a rearward position of the vehicle from the front support shaft.

15. The sunroof apparatus according to claim 5, wherein the front link is configured to include a second holding shaft that, when the front link is positioned between the front-up corresponding position and the full-open corresponding position, can engage with the front shoe from above at a rearward position of the vehicle from the front support shaft.

16. The sunroof apparatus according to claim 6, wherein the front link is configured to include a second holding shaft that, when the front link is positioned between the front-up corresponding position and the full-open corresponding position, can engage with the front shoe from above at a rearward position of the vehicle from the front support shaft.

17. The sunroof apparatus according to claim 7, wherein the front link is configured to include a second holding shaft that, when the front link is positioned between the front-up corresponding position and the full-open corresponding position, can engage with the front shoe from above at a rearward position of the vehicle from the front support shaft.

18. The sunroof apparatus according to claim 8, wherein the front link is configured to include a second holding shaft that, when the front link is positioned between the front-up corresponding position and the full-open corresponding position, can engage with the front shoe from above at a rearward position of the vehicle from the front support shaft.

19. The sunroof apparatus according to claim 9, wherein the front link is configured to include a second holding shaft that, when the front link is positioned between the front-up corresponding position and the full-open corresponding position, can engage with the front shoe from above at a rearward position of the vehicle from the front support shaft.

20. The sunroof apparatus according to claim 10, wherein the front link is configured to include a second holding shaft that, when the front link is positioned between the front-up corresponding position and the full-open corresponding position, can engage with the front shoe from above at a rearward position of the vehicle from the front support shaft.

\* \* \* \* \*